US011919735B2

(12) United States Patent
Sakagami

(10) Patent No.: US 11,919,735 B2
(45) **Date of Patent: *Mar. 5, 2024**

(54) RECORDING DEVICE

(71) Applicant: SEIKO EPSON CORPORATION, Tokyo (JP)

(72) Inventor: Shota Sakagami, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/933,004

(22) Filed: Sep. 16, 2022

(65) Prior Publication Data

US 2023/0010089 A1 Jan. 12, 2023

Related U.S. Application Data

(63) Continuation of application No. 16/435,790, filed on Jun. 10, 2019, now Pat. No. 11,447,357.

(30) Foreign Application Priority Data

Jun. 13, 2018 (JP) ................................ 2018-112874

(51) Int. Cl.
*B65H 29/24* (2006.01)
*G03G 15/00* (2006.01)

(52) U.S. Cl.
CPC ....... *B65H 29/245* (2013.01); *G03G 15/6552* (2013.01); *B65H 2402/50* (2013.01); *B65H 2405/11151* (2013.01); *B65H 2406/12* (2013.01); *B65H 2515/20* (2013.01); *B65H 2801/27* (2013.01)

(58) Field of Classification Search
CPC .... B65H 29/245; B65H 29/247; B65H 31/16; B65H 2515/212; B65H 2406/12
See application file for complete search history.

(56) References Cited

U.S. PATENT DOCUMENTS 10,865,064 B2 * 12/2020 Kawasaki .............. B65H 31/02
10,894,684 B2 * 1/2021 Okada ................ G03G 15/6573
(Continued)

FOREIGN PATENT DOCUMENTS

JP S56-000271 1/1981
JP H02-019058 2/1990
(Continued)

*Primary Examiner* — Patrick Cicchino
(74) *Attorney, Agent, or Firm* — WORKMAN NYDEGGER

(57) ABSTRACT

Provided is a recording device that includes a recording head that ejects a liquid, a discharge unit that discharges a recorded recording medium, a discharge tray that receives a discharged recording medium, a first blowing unit that is disposed above the discharge unit and blows air toward one surface of the recording medium to be discharged to the discharge tray, and a second blowing unit that is disposed between the discharge unit and the discharge tray and blows air toward the other surface of the recording medium to be discharged to the discharge tray, and a control unit that controls the first blowing unit and the second blowing unit, in which deformation of the recording medium to be discharged is suppressed by the wind of the first blowing unit and the second blowing unit and the recording medium is discharged.

19 Claims, 14 Drawing Sheets

(56) References Cited

U.S. PATENT DOCUMENTS

| | | | |
|---|---|---|---|
| 2011/0219641 | A1 | 9/2011 | Fujikura et al. |
| 2012/0093555 | A1 | 4/2012 | Obuchi |

FOREIGN PATENT DOCUMENTS

| | | | | |
|---|---|---|---|---|
| JP | 2008-239320 | | | 10/2008 |
| JP | 2010-006560 | A | | 1/2010 |
| JP | 2010-096954 | | | 4/2010 |
| JP | 2010-132372 | | | 6/2010 |
| JP | 2011-184165 | A | | 9/2011 |
| JP | 2012-101942 | A | | 5/2012 |
| JP | 2013-028456 | A | | 2/2013 |
| JP | 2014-040326 | A | | 3/2014 |
| JP | 2014-055069 | A | | 3/2014 |
| JP | 2015-036331 | | | 2/2015 |
| JP | 2015036331 | A | * | 2/2015 |
| JP | 2016-056015 | | | 4/2016 |
| JP | 2017-102196 | | | 6/2017 |

* cited by examiner

RECORDING DEVICE

This application is a continuation application of U.S. patent application Ser. No. 16/435,790, filed Jun. 10, 2019, which claims the benefit of and priority to Japanese Patent Application No. 2018-112874 filed on Jun. 13, 2018. The entire disclosures of the above-mentioned applications are hereby incorporated herein by reference.

BACKGROUND

1. Technical Field

The present disclosure relates to a recording device.

2. Related Art

In the related art, various types of recording devices are in use. Among them, a recording device configured to stack recorded recording medium on a discharge tray is in use.

For example, JP-A-2014-55069 discloses an image forming device (recording device) that is configured to stack a recorded paper sheet (recording medium) on a shift tray (discharge tray) and that can blow air in a discharge direction of a paper sheet by operation a blowing fan for the purpose of reducing adhesion between paper sheets.

The image forming device of JP-A-2014-55069 is a recording device that forms an image by using a toner, but a recording device that forms an image by ejecting ink, which is a liquid, onto a recording medium is widely used. In a recording device that forms an image by ejecting a liquid onto a recording medium, when recording is performed on a recording medium, the recording medium curls to be deformed under the influence of moisture or the like in the ink in some cases, for example. Therefore, in a recording device configured to stack the recorded recording medium on a discharge tray, the recording medium to be discharged to the discharge tray is deformed and stackability of the recording medium deteriorates in some cases.

Here, the image forming device disclosed in JP-A-2014-55069 is not a recording device that forms the image by ejecting the liquid onto the recording medium, does not consider an issue concerning deformation of the recording medium to be discharged to the discharge tray, and is not configured to suppress deformation of the recording medium to be discharged to the discharge tray even if a blowing fan is driven.

SUMMARY

According to an aspect of the disclosure, there is provided a recording device that includes a recording head that records by ejecting a liquid onto a recording medium, a discharge unit that discharges the recording medium recorded by the recording head, a discharge tray that receives, from a lower side in the vertical direction, the recorded recording medium discharged from the discharge unit in a discharge direction, a first blowing unit that is disposed above the discharge unit in the vertical direction and blows air, from upstream toward downstream in the discharge direction, to one surface of the recording medium to be discharged to the discharge tray, a second blowing unit that is disposed between the discharge unit and the discharge tray in the vertical direction and blows air, from upstream toward downstream, to the other surface of the recording medium to be discharged to the discharge tray.

DESCRIPTION OF EXEMPLARY EMBODIMENTS

Figure 1:
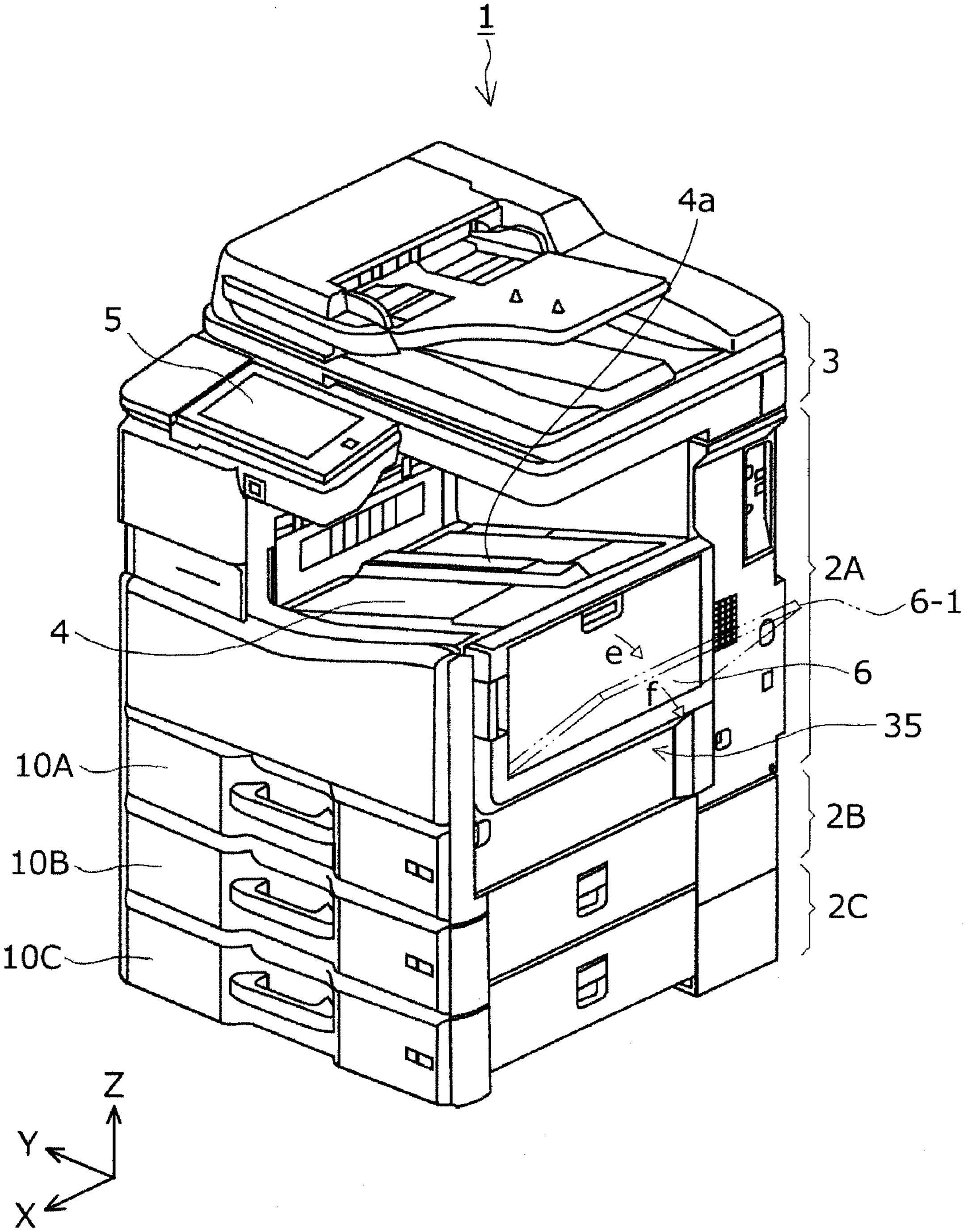
FIG. 1 is a schematic perspective view of a recording device according to Embodiment 1 of the present disclosure.

First, the present disclosure will be outlined.

According to a first aspect of the present disclosure, a recording device includes a recording head that records by ejecting a liquid onto a recording medium, a discharge unit that discharges the recording medium recorded by the recording head, a discharge tray that receives, from a lower side in the vertical direction, the recording medium discharged from the discharge unit in a discharge direction, a first blowing unit that is disposed above the discharge unit in the vertical direction and blows air, from upstream toward downstream in the discharge direction, to one surface of the recording medium to be discharged from the discharge tray, a second blowing unit that is disposed between the discharge unit and the discharge tray in the vertical direction and blows air, from upstream toward downstream in the discharge direction, to the other surface of the recording medium to be discharged from the discharge tray, and a control unit controls the first blowing unit and the second blowing unit, in which deformation of the recording medium to be discharged is suppressed by the wind of the first blowing unit and the second blowing unit and the recording medium is discharged.

According to the present aspect, air is blown, from upstream toward downstream in the discharge direction, to one surface of the recording medium by the first blowing unit from above in the vertical direction, and air is blown, from upstream toward downstream in the discharge direction, to the other surface of the recording medium by the second blowing unit from below in the vertical direction. That is, pinched by the wind from above by the first blowing unit and the wind from below by the second blowing unit, the recording medium to be discharged to the discharge tray is guided downstream. Therefore, it is possible to suppress the deformation in the discharge direction of the recording medium to be discharged to the discharge tray and improve stackability of the recording medium.

Here, "the other surface of the recording medium" means a surface opposite to the one surface of the recording medium.

According to a second aspect of the present disclosure, in the first aspect, the recording device can change the air blowing directions of the first blowing unit and the second blowing unit, and the control unit causes the first blowing unit and the second blowing unit to blow air to the recording medium to be discharged to the discharge tray so that airflow is generated from an upstream side in the discharge direction and center side in the width direction that intersects with the discharge direction toward a downstream end portion in the discharge direction and side end portion in the width direction.

According to the present aspect, it is possible to discharge the recording medium to the discharge tray in the direction from upstream toward downstream such that the recording medium is pressed and spread out in the width direction by the airflow from the center side toward the side end portion side in the width direction. Therefore, it is possible to suppress the deformation in the width direction of the recording medium to be discharged to the discharge tray.

According to a third aspect of the present disclosure, in the first or the second aspect, the recording device can change the air blowing directions of the first blowing unit and the second blowing unit are changeable, and the control unit causes the first blowing unit and the second blowing unit to blow air to the recording medium in a state of being discharged to the discharge tray, toward a downstream end portion in the discharge direction and the side end portion in the width direction that intersects with the discharge direction.

According to the present aspect, since the first blowing unit and the second blowing unit blow air to the recording medium in the state of being discharged to the discharge tray downstream toward the end portion in the width direction, it is possible to suppress the deformation, the curving of the end portion of the recording medium downstream and in the width direction in particular, of the recording medium after being discharged to the discharge tray.

According to a fourth aspect of the present disclosure, in any one of the first to the third aspects, the recording device includes a third blowing unit that is disposed between the discharge unit and the discharge tray in the vertical direction and that blows air to the recording medium in the state of being discharged to the discharge tray toward the upstream end portion.

According to the present aspect, since the third blowing unit that blows air to the recording medium in the state of being discharged to the discharge tray toward the upstream end portion, it is possible to suppress the deformation of the recording medium after being discharged to the discharge tray, the curving of the upstream end portion of the recording medium in particular.

According to a fifth aspect of the present disclosure, in the fourth aspect, the control unit in the recording device causes the third blowing unit to blow air toward the side end portion of the recording medium in the width direction that intersects with the discharge direction.

According to the present aspect, since the third blowing unit blows air toward the end portion of the recording medium in the width direction, it is possible to suppress the curving of the end portion of the recording medium after being discharged to the discharge tray in the upstream and width direction.

According to a sixth aspect of the present disclosure, in the fourth or the fifth aspect, the control unit in the recording device causes the first blowing unit and the third blowing unit to continue to blow air continuously during a period when the recording medium is discharged from the discharge unit.

According to the present aspect, since the first blowing unit and the third blowing unit continue to blow air continuously during the period when the recording medium is discharged from the discharge unit, when a plurality of recording media are discharged from the discharge unit, for example, it is possible to enhance the suppression effect of the deformation of the recording medium in the state of being discharged from the discharge tray.

According to a seventh aspect of the present disclosure, in the sixth aspect, the control unit in the recording device causes the first blowing unit and the third blowing unit to stop blowing air based on removal of the recording medium from the discharge tray or lapse of predetermined time after the recording medium is last discharged from the discharge unit when the recording medium is continuously discharged from the discharge unit.

According to the present aspect, it is possible to suppress unnecessary air blowing after the recording medium is removed from the discharge tray or when the predetermined time has elapsed after the recording medium was last discharged from the discharge unit, and deformation of the recording medium hardly occurs.

According to an eighth aspect of the present disclosure, in any one of the first to the seventh aspects, the recording device includes a fourth blowing unit that is disposed above the discharge unit in the vertical direction and that blows air to the recording medium in a state of being discharged from the discharge tray toward upstream end portion.

According to the present aspect, since the fourth blowing unit that blows air to the recording medium in the state of being discharged from the discharge tray toward the upstream end portion is provided, it is possible to suppress the deformation, the curving of the upstream end portion of the recording medium in particular, of the recording medium after being discharged from the discharge tray.

According to a ninth aspect of the present disclosure, in the eighth aspect, the fourth blowing unit in the recording device is disposed outside the first blowing unit in the width direction that intersects with the discharge direction, and the control unit causes the fourth blowing unit to blow air toward the side end portion of the recording medium in the width direction.

According to the present aspect, since the fourth blowing unit blows air toward the end portion of the recording medium in the width direction, it is possible to suppress the curving of the upstream end portion of the recording medium after being discharged from the discharge tray in the width direction.

According to a tenth aspect of the present disclosure, in the eighth or the ninth aspect, as the upstream end portion of the recording medium is discharged from the discharge unit, the control unit in the recording device causes the fourth blowing unit to start to blow air.

According to the present aspect, since the fourth blowing unit starts to blow air as the upstream end portion of the recording medium is discharged from the discharge unit, it is possible to enhance the suppression effect of the deformation of the recording medium in the middle of being discharged from the discharge unit by blowing air to the upstream end portion as the upstream end portion is discharged from the discharge unit.

According to an eleventh aspect of the present disclosure, in the tenth aspect, when the recording medium is continuously discharged from the discharge unit, the control unit in the recording device causes the fourth blowing unit to stop blowing air after a preceding recording medium is discharged from the discharge unit until the downstream end portion of a succeeding recording medium that is to be discharged from the discharge unit succeeding the preceding recording medium starts to be discharged from the discharge unit.

When the fourth blowing unit continues to blow air after the preceding recording medium is discharged from the discharge unit and even after the downstream end portion of the succeeding recording medium starts to be discharged from the discharge unit, there is a concern that the downstream end portion of the succeeding recording medium is deformed by the air blowing from the fourth blowing unit. However, according to the present aspect, since the fourth blowing unit stops blowing after the preceding recording medium is discharged from the discharge unit until the downstream end portion of the succeeding recording medium starts to be discharged from the discharge unit, it is possible to suppress the deformation of the downstream end portion of the succeeding recording medium.

According to a twelfth aspect of the present disclosure, in the tenth or the eleventh aspect, when the recording medium is continuously discharged from the discharge unit, the control unit in the recording device causes the fourth blowing unit to stop blowing air based on the removal of the recording medium from the discharge tray or the lapse of predetermined time after the recording medium is last discharged from the discharge unit.

According to the present aspect, it is possible to suppress unnecessary air blowing after the recording medium is discharged from the discharge tray or when the predetermined time has elapsed after the recording medium was last discharged from the discharge unit, and the deformation of the recording medium hardly occurs.

According to a thirteenth aspect of the present disclosure, in any one of the eighth to twelfth aspects, the control unit in the recording device causes the first blowing unit and the fourth blowing unit to change the air blowing directions in accordance with the position of the side end portion of the recording medium in the state of being discharged to the discharge tray in the width direction that intersects with the discharge direction.

According to the present aspect, it is possible to suppress the deformation of the downstream end portion of the recording medium in the width direction by the first blowing unit and it is possible to suppress the deformation of the upstream end portion of the recording medium in the width direction by the fourth blowing unit.

According to a fourteenth aspect of the present disclosure, in any one of the first to thirteenth aspects, the control unit in the recording device causes the second blowing unit to blow air after the downstream end portion in the recording medium starts to be discharged from the discharge unit until the upstream end portion in the recording medium is discharged from the discharge unit and to cause the second blowing unit to stop blowing air as the upstream end portion in the recording medium is discharged from the discharge unit.

According to the present aspect, since the second blowing unit blows air after the downstream end portion of the recording medium is discharged from the discharge unit until the upstream end portion of the recording medium is discharged from the discharge unit, it is possible to enhance the suppression effect of the deformation of the recording medium in the middle of being discharged from the discharge unit. Also, since air blowing is stopped as the upstream end portion of the recording medium is discharged from the discharge unit, it is possible to suppress unnecessary air blowing that hinders the recording medium from being stacked on the discharge tray.

According to a fifteenth aspect of the present disclosure, in any one of the first to the fourteenth aspects, the first blowing unit and the second blowing unit in the recording device are disposed above an upper limit of the stacking height of the recording medium to be stacked on the discharge tray in the vertical direction.

According to the present aspect, since the first blowing unit and the second blowing unit are disposed above the upper limit of the stacking height of the recording medium to be stacked on the discharge tray in the vertical direction, it is possible to suppress the deformation of the recording medium even if the stacking height of the recording medium reaches the upper limit.

According to a sixteenth aspect of the present disclosure, in any one of the first to the fifteenth aspects, the control unit in the recording device causes the first blowing unit and the second blowing unit to change air blowing directions in accordance with the length, in the discharge direction, of the recording medium to be discharged to the discharge tray.

According to the present aspect, since the first blowing unit and the second blowing unit change the air blowing directions in accordance with the length, in the discharge direction, of the recording medium to be discharged from the discharge tray, it is possible to suitably suppress the deformation of the recording medium in accordance with the length, in the discharge direction, of the recording medium to be used.

According to a seventeenth aspect of the present disclosure, in the sixteenth aspect, the first blowing unit and the second blowing unit in the recording device change air blowing directions following the position of the downstream end portion in the recording medium to be discharged to the discharge tray.

According to the present aspect, since the first blowing unit and the second blowing unit change the air blowing directions following the position of the downstream end portion of the recording medium to be discharged to the discharge tray, it is possible to suppress the deformation of the downstream end portion of the recording medium in particular.

In the following, a recording device 1 according to an embodiment of the present disclosure will be described in detail with reference to the attached drawings. In the following, an ink jet printer is taken as an example of the recording device 1 according to the disclosure.

Also, in the ink jet method, there are various forms such as a type in which an ink cartridge is mounted in a carriage, a type in which an ink container is provided outside the carriage such that the ink container and the carriage are coupled to each other by an ink tube, or the like, and the present disclosure is applicable to any form. The recording device 1 of the present embodiment is of a type in which the ink container is provided outside the carriage such that the ink container and the carriage are coupled to each other by the ink tube.

In the X-Y-Z coordinate system shown in each figure, the X-axis direction is the front surface and rear surface direction of the device and the width direction of the recording medium, Y-axis direction is the medium transport direction while the recording is performed on the recording medium and the lateral direction of the device, and Z-axis direction indicates the height direction of the device and the vertical direction. The direction in which the recording medium is transported is referred to as "downstream" and the opposite is referred to as "upstream". Also, in each figure, some constituent members are omitted and simplified to make the internal configuration easy to understand.

Embodiment 1 (FIGS. 1 to 10)

Figure 2:
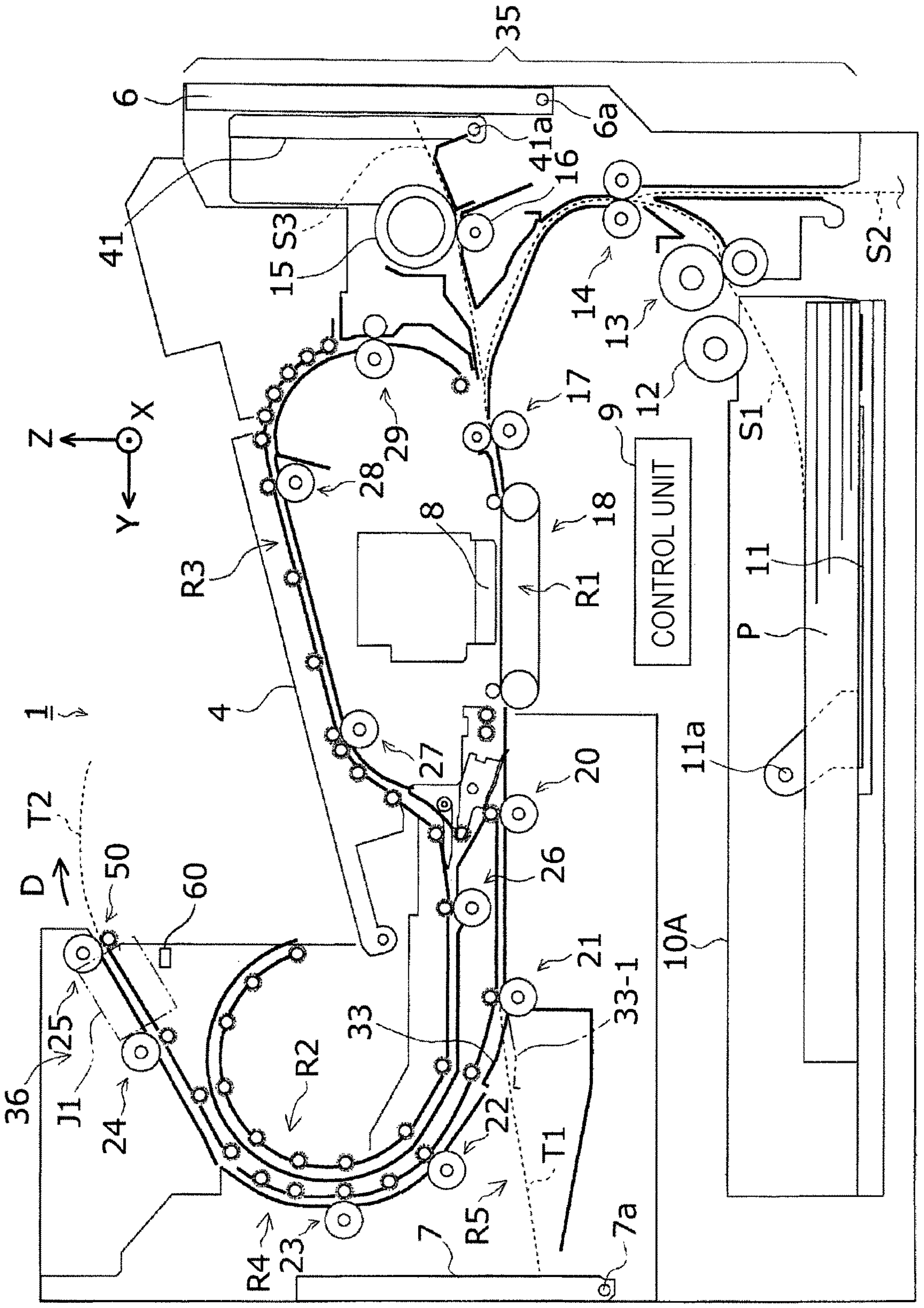
FIG. 2 is a schematic front sectional view of the recording device according to Embodiment 1 of the disclosure.

First, the overall configuration of the recording device 1 of Embodiment 1 will be outlined with reference to FIGS. 1 and 2.

In FIGS. 1 and 2, a first blowing unit 51, a second blowing unit 52, a third blowing unit 53, and a fourth blowing unit 54 which are the major parts of the recording device 1 are omitted to prioritize the description of the overall configuration of the recording device 1. Details of the first blowing unit 51, the second blowing unit 52, the third blowing unit 53, and the fourth blowing unit 54 will be described below after the overall configuration of the recording device 1 is described.

The recording device 1 in FIG. 1 includes a scanner unit 3 above a device main body 2A that performs recording on a paper sheet P as a recording medium and additional units 2B and 2C below the device main body 2A. The device main body 2A includes a paper sheet cassette 10A, an additional unit 2B includes a paper sheet cassette 10B, and an additional unit 2C includes a paper sheet cassette 10C. The additional units 2B and 2C are optional units to increase the number of paper sheets accommodated and are optionally attached to the device main body 2A.

The recording device 1 of the present embodiment includes an operation unit 5 that performs various operations, a discharge tray 4 that receives paper sheet P, and a feeding unit 35 configured to open/close with respect to the device main body 2A by pivoting around a pivot fulcrum (not shown). Here, more specifically, the discharge tray 4 is a face-down discharge tray that receives the paper sheet P to be discharged with the recording surface on which the latest recording was performed facing down and is a discharge tray that receives the paper sheet P discharged from a discharge roller pair 25, to be described below, in a discharge direction D from the lower side in the vertical direction.

Also, the recording device 1 includes an opening/closing cover 6 that forms the feeding unit 35 and, as shown in FIG. 2, the opening/closing cover 6 is configured to swing around a swing shaft 6*a* and can be opened in the direction indicated by the arrows e and f in FIG. 1. The opening/closing cover 6-1 denoted by an imaginary line in FIG. 1 shows the opening/closing cover 6 in the middle of opening/closing.

As shown in FIG. 2, a manual tray 41 is provided inside the opening/closing cover 6. The manual tray 41 pivots around a swing shaft 41*a* and can be opened/closed together with the opening/closing cover 6. The manual tray 41 shown in FIG. 2 is in a storing position and can be opened in a clockwise direction from the state in FIG. 2 so that manual feeding of paper sheet is made possible in a state of tilting upward.

In the recording device 1, the side on which the operation unit 5 is disposed is the front surface side of the device and the side on which the opening/closing cover 6 is provided is the right surface side surface. That is, feeding, transport, and discharge of the paper sheet P in the recording device 1 is performed in the right/left direction of the device.

Next, a paper sheet transport path in the recording device 1 will be described with reference to FIG. 2. The recording device 1 includes three paper sheet feeding paths such as a feeding path (refer to cassette feeding trajectory S1) from the paper sheet cassette 10A, feeding paths (refer to additional cassette feeding trajectory S2) from the paper sheet cassettes 10B and 10C (not shown in FIG. 2), and a feeding path (refer to manual feeding path S3) from the manual tray 41 stacked with the paper sheet P.

Also, the recording device 1 has two paper sheet discharge methods such as a face-up discharge (refer to face-up discharge trajectory T1) of discharging with the recording surface on which the latest recording was performed facing up and a face-down discharge (refer to face-down discharge trajectory T2) of discharging with the recording surface on which the latest recording was performed facing down.

Also, the recording device 1 includes a face-up paper sheet discharge tray 7 that receives the paper sheet P discharged face up as shown in FIG. 2. By pivoting around the pivot shaft 7*a*, the face-up paper sheet discharge tray 7 can assume a storing state shown in FIG. 2 and an open state (not shown).

The recording device 1 includes five paper sheet transport paths such as a recording transport path R1, a switchback path R2, a reversing path R3, a face-down discharge path R4, and a face-up discharge path R5.

Also, the recording device 1 includes a flap (path switching member) 33 driven by a driving source (not shown) and switches between a state denoted by a solid line and a state denoted by a flap 33-1 of an imaginary line in FIG. 2. When the flap 33 is in a state denoted by the solid line in FIG. 2, the paper sheet P is guided to the face-down discharge path R4 and is discharged face down as shown by the face-down discharge trajectory T2. The downstream end of the face-down discharge path R4 is composed of a discharge mechanism unit 36. It should be noted that a plurality of driven rollers (spurs) are provided in the region J1 in FIG. 2. When the flap 33 is in a state of the imaginary line in FIG. 2, the paper sheet P is guided to the race-up discharge path R5 and discharged face up as shown by the face-up discharge trajectory T1.

The control unit 9 that performs various types of control acquires recording data to be recorded, generated by a printer driver operating on an external computer (not shown)

or a printer driver included in the control unit 9. Then, based on the recording data, the control unit 9 controls an ink jet recording head (hereinafter referred to as “recording head”) 8, various types of the paper sheet transport rollers driven by a motor (not shown), each path switching member (flap), and the like. Also, the control unit 9 performs necessary controls based on the detection states of various sensors such as a sensor that detects passage of the paper sheet P, for example. The control unit 9 is conceptually shown in FIG. 2, and actually is composed of a circuit board provided at a predetermined position inside the device main body 2A.

Here, the paper sheet feeding path up to the registration roller pair 17 will be described.

The cassette 10A attachably/detachably provided in the device main body 2A includes a hopper 11, and as the hopper 11 swings around a shaft 11*a*, the paper sheet contained in the paper sheet cassette 10A comes into contact with a feeding roller 12 rotatably driven by a motor (not shown).

The paper sheet P delivered from the paper sheet cassette 10A by the feeding roller 12 is subjected to feeding force from a transport roller pair 14 to reach the registration roller pair 17 in a state where the paper sheet P, passing through a nip position, is separated by the separating roller pair 13 to be prevented from double feeding. The additional units 2B and 2C positioned below the device main body 2A also include a feeding roller 12 and a separating roller pair 13 similarly, and the paper sheet delivered from each paper sheet cassette is subjected to the feeding force from the transport roller pair 14 shown in FIG. 2 to reach the registration roller pair 17. Also, the feeding roller 15 and the separating roller 16 are provided in the paper sheet feeding path (manual feeding path S3) from the manual tray 41, and, by the rotation of these rollers, the paper sheet P set in the manual tray 41 reaches the registration roller pair 17.

Next, the first to fourth transport paths which are paper sheet transport paths downstream of the registration roller pair 17, will be described on a premise that the paper sheet P is discharged face down through the face-down discharge path R4.

The registration roller pair 17, the transport roller pairs 20 to 24, the transport roller pairs 26 to 29, and the discharge roller pair 25 serving as the discharge unit that discharges the paper sheet P recorded by the recording head 8 are provided in the paper sheet transport path. The discharge roller pair 25 provided at the downstream end of the face-down discharge path R4 constitutes the discharge unit that discharges the paper sheet P from the face-down discharge path R4 and discharges the paper sheet P from the discharge port 50 in the discharge direction D.

Each roller pair has a driving roller driven by a motor (not shown) and a driven roller that is driven to rotate in contact with the paper sheet P while nipping the paper sheet P between the driving roller and the driven roller. An example of the driving roller includes a plurality of rubber rollers or the like provided at proper intervals in the paper sheet width direction. Also, an example of the driven roller includes a gear roller having a plurality of cogs on the outer periphery.

The recording transport path R1 as the first transport path passes below the recording head 8 as a recording unit that records by ejecting ink which is a liquid onto a paper sheet P and that extends upstream and downstream thereof. The paper sheet P is subjected to the feeding force from the registration roller pair 17 and a belt unit 18 in the recording transport path R1.

The recording head 8 of the present embodiment is a recording head (so-called line head) provided so that a nozzle that ejects the ink covers the entire area in the paper sheet width direction, and is composed of the recording head that is configured to record on the entire paper sheet width without moving in the paper sheet width direction. However, the recording head is not limited to a line head as long as the recording head records by ejecting a liquid such as ink onto a recording medium.

The switchback path R2 as the second transport path is coupled to the recording transport path R1, feeds the paper sheet P which has passed below the recording head 8 in the left direction in FIG. 2 and switchbacks to feed the paper sheet P in the right direction in FIG. 2 which is a reverse direction to the feeding direction, and is positioned inside the curved portion with respect to the face-down discharge path R4 to be described below. In the switchback path R2, the paper sheet P is subjected to the feeding force from the transport roller pair 26.

The reversing path R3 as the third transport path is coupled to the switchback path R2, reverses the paper sheet P transported in a reverse direction which is the right direction in FIG. 2 bypassing the recording head 8 above, and puts the paper sheet P back in the recording transport path R1 at an upstream position of the recording head 8 which is the upstream position of the registration roller pair 17 in the present embodiment. In the reversing path R3, the paper sheet P is subjected to the feeding force from the transport roller pairs 27, 28, and 29.

The face-down discharge path R4 as the fourth transport path is coupled to the recording transport path R1, curves the paper sheet P that has passed below the recording head 8 with the surface facing the recording head 8 inward, and discharges the paper sheet P reversed. In the face-down discharge path R4, the paper sheet P is subjected to the feeding force from the transport roller pairs 20, 21, 22, 23, and 24 and the discharge roller pair 25. The downstream end of the face-down discharge path R4 is composed of the discharge mechanism unit 36 as described above.

A flap as a path switching member that performs the transport path switching is provided at the connection unit of each transport path. Then, a path along which the paper sheet P advances is set by the flap. Further, the recording device 1 of the present embodiment includes a sensor 60 that detects whether or not the stacking height of the paper sheet P stacked in the discharge tray 4 in the vertical direction has reached an upper limit.

Next, the first blowing unit 51, the second blowing unit 52, the third blowing unit 53, and the fourth blowing unit 54, which are major parts of the recording device 1 will be described in detail with reference to FIGS. 3 to 7.

Figure 3:
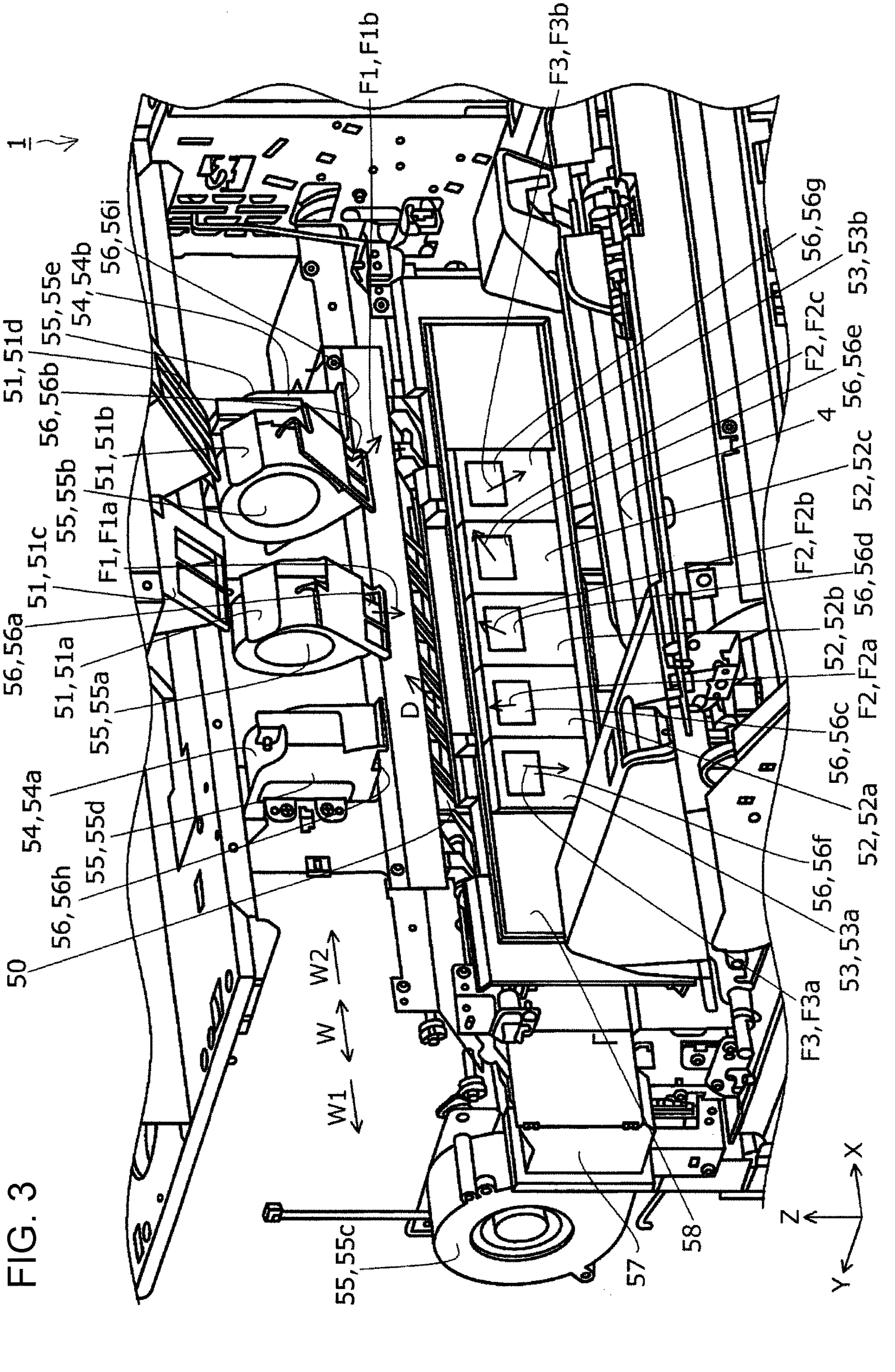
FIG. 3 is a schematic perspective view of a major part of the recording device according to Embodiment 1 of the disclosure and a schematic view for a description of a first blowing unit, a second blowing unit, and a third blowing unit.
Figure 4:
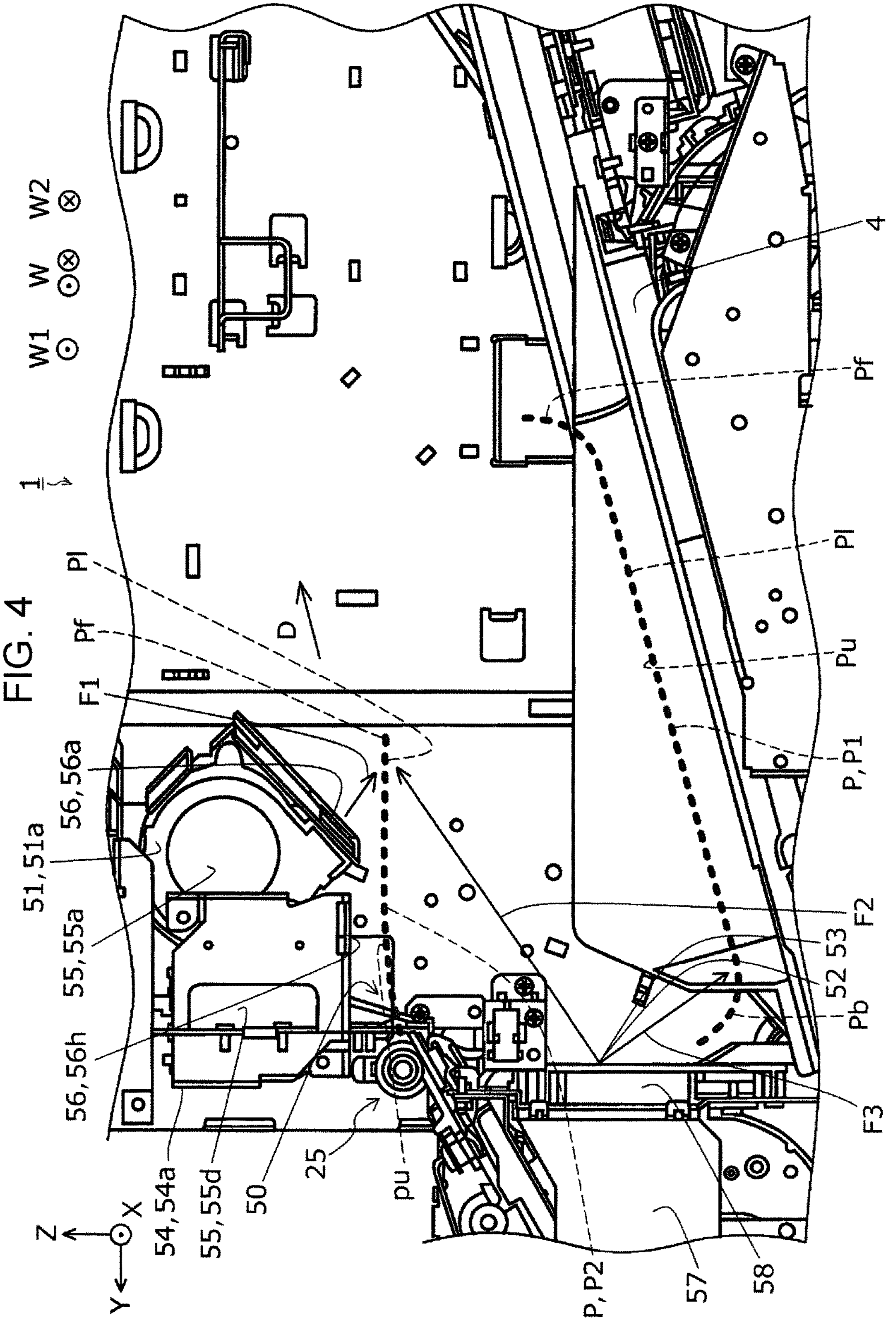
FIG. 4 is a schematic front sectional view of a major part of the recording device according to Embodiment 1 and a schematic view for description of the first blowing unit, the second blowing unit, and the third blowing unit.

Here, FIG. 4 shows a state of air blowing from the first blowing unit 51 and the second blowing unit 52 in a state where a paper sheet P1 out of the paper sheet P is stacked on the discharge tray 4 and a paper sheet P2 out of the paper sheet P is in the middle of being discharged from the discharge roller pair 25. It should be noted that FIG. 3 shows the same state as FIG. 4, but the paper sheet P is omitted to make the air blowing directions of the first blowing unit 51 and the second blowing unit 52 easy to understand.

Figure 5:
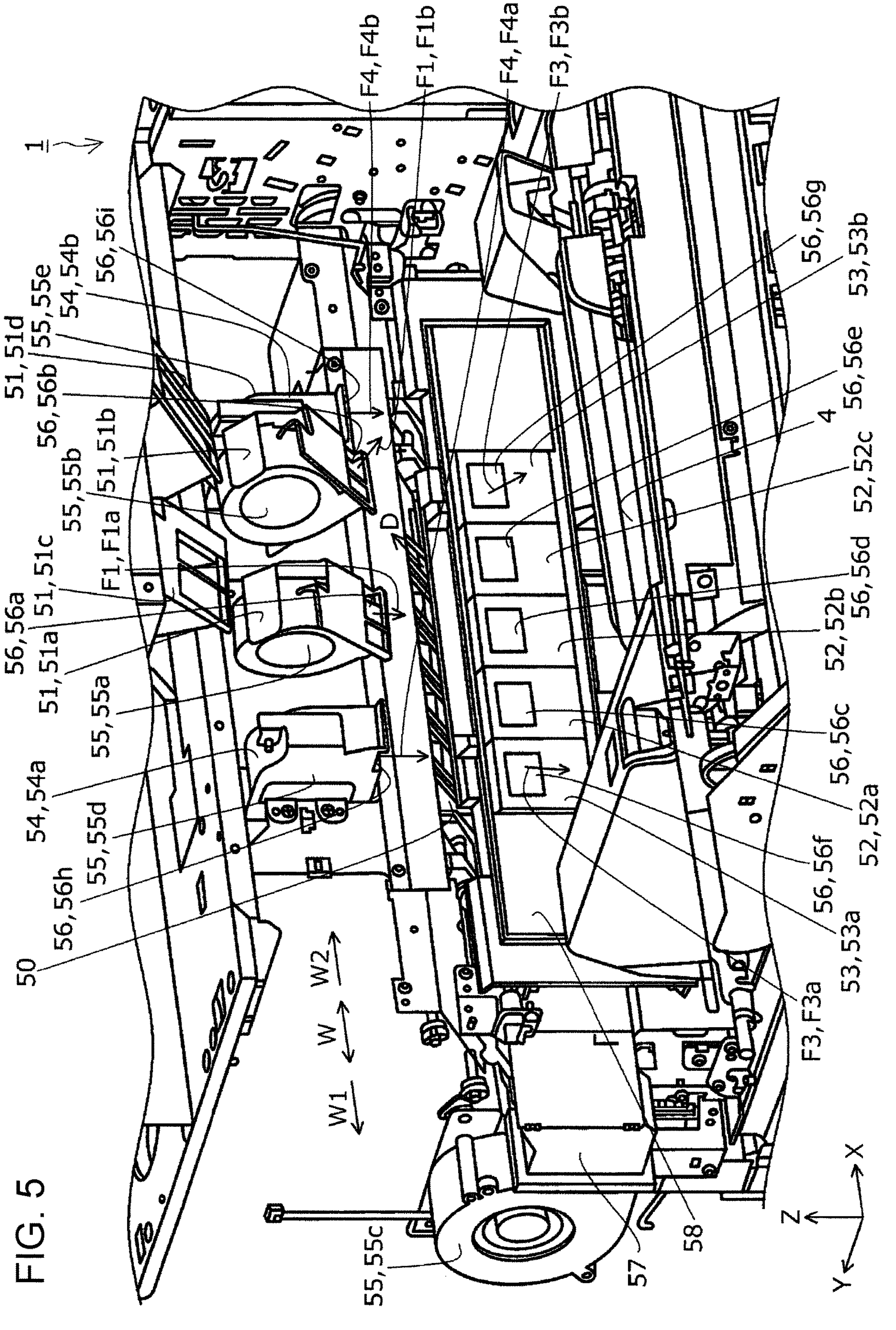
FIG. 5 is a schematic perspective view of a major part of the recording device according to Embodiment 1 of the disclosure and a schematic view for description of the first blowing unit, the third blowing unit, and a fourth blowing unit.
Figure 6:
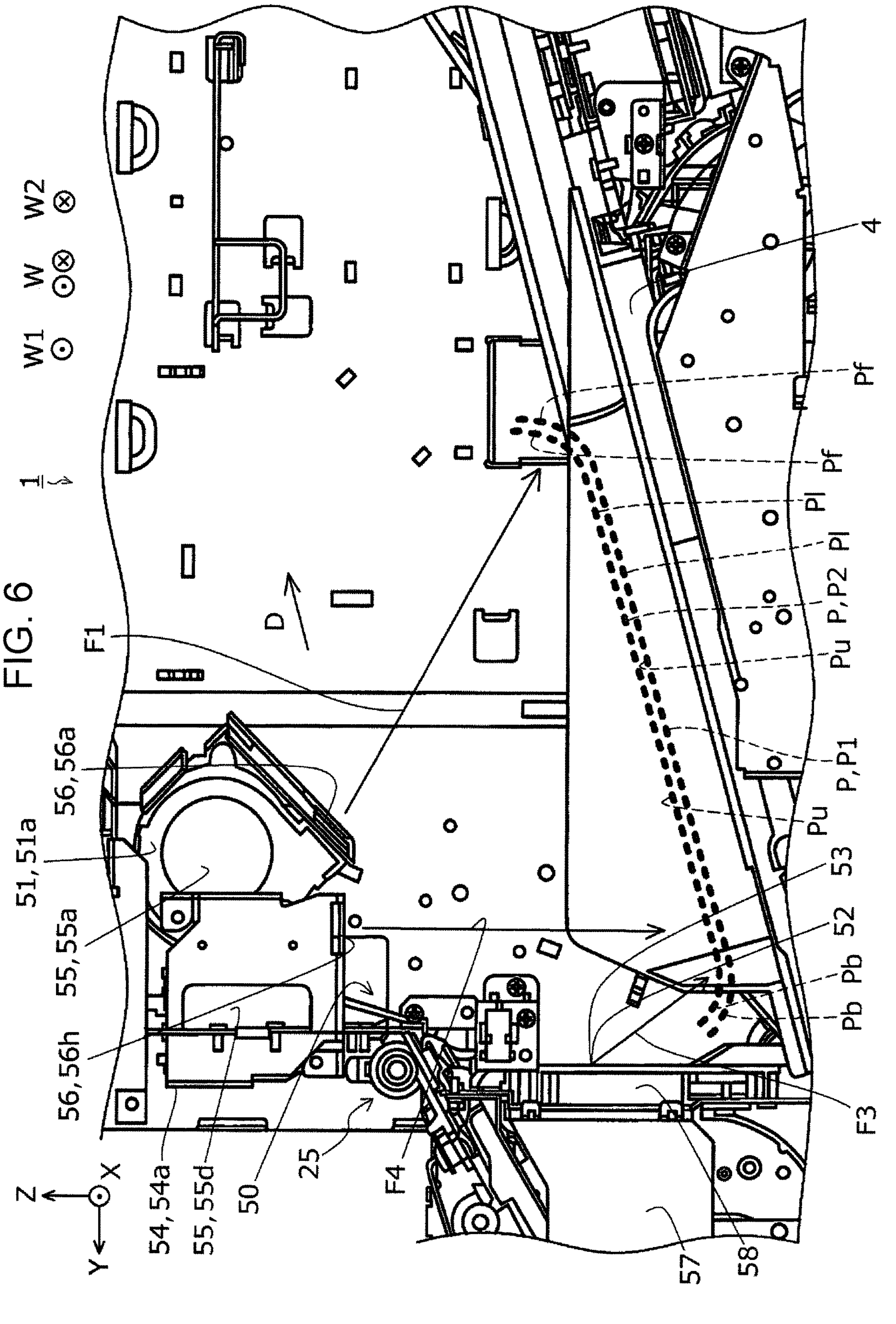
FIG. 6 is a schematic front sectional view of a major part of the recording device according to Embodiment 1 of the disclosure and a schematic view for description of the first blowing unit, the third blowing unit, and the fourth blowing unit.
Figure 7:
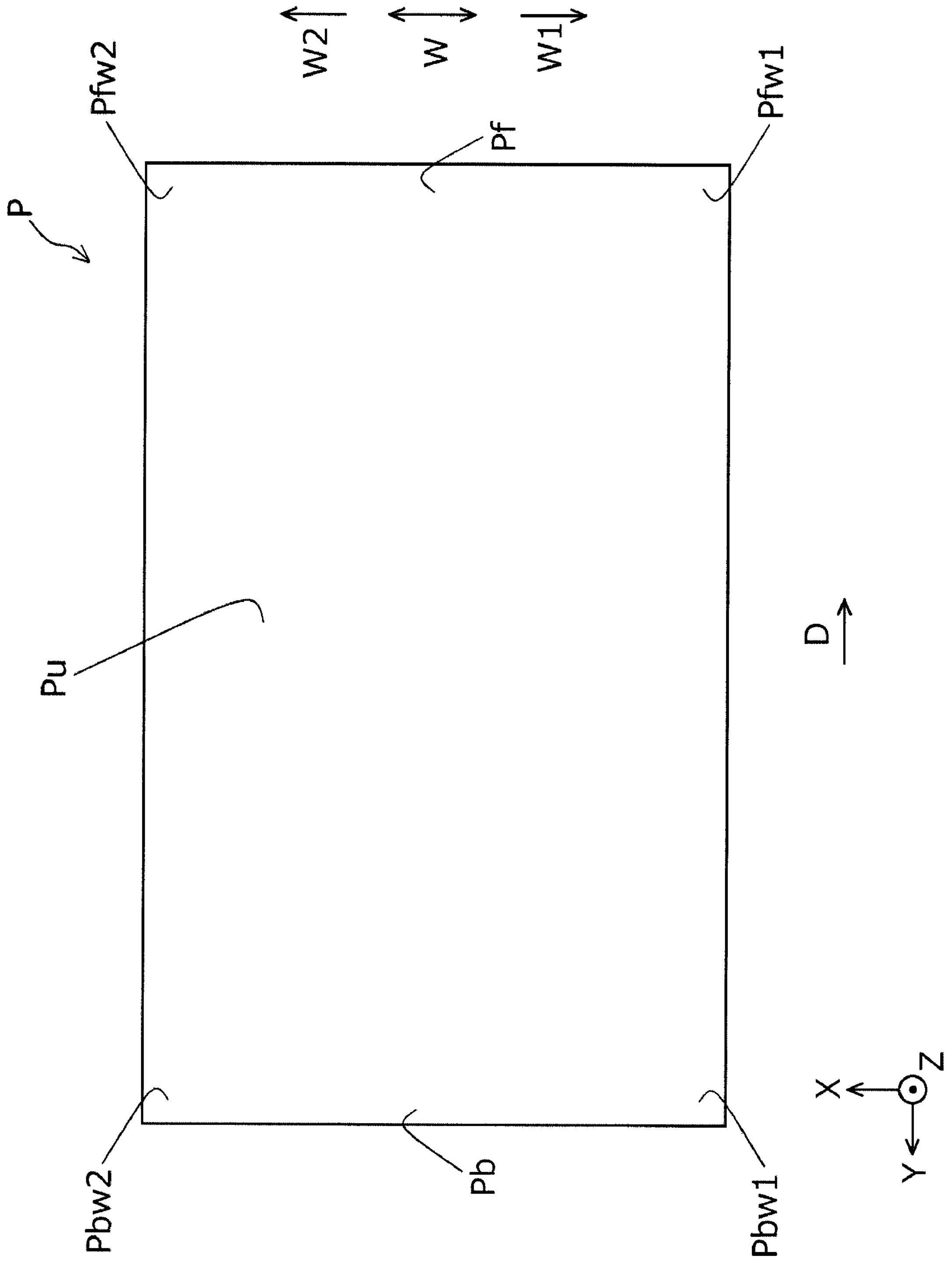
FIG. 7 is a schematic plan view showing a recording medium to be discharged to a discharge tray in the recording device according to Embodiment 1 of the disclosure.

Also, FIG. 6 shows a state of air blowing from the first blowing unit 51, the third blowing unit 53, and the fourth blowing unit 54 in a state where the paper sheet P2 shown in FIG. 4 is discharged on the discharge tray 4. It should be noted that FIG. 5 shows the same state as FIG. 6, but the paper sheet P is omitted to make the air blowing directions of the first blowing unit 51, the third blowing unit 53, and the fourth blowing unit 54 easy to understand.

As shown in FIGS. 3 to 6, the recording device 1 includes the first blowing unit 51. As shown in FIGS. 3 to 5, in the first blowing unit 51, a first blowing unit 51*a* and a first blowing unit 51*b* are disposed in the vicinity of a center portion in the width direction W that intersects with the discharge direction D of the discharge port 50. Further, a first blowing unit 51*c* and a first blowing unit 51*d* are disposed downstream of the first blowing unit 51*a* and the first blowing unit 51*b* in the discharge direction D. Also, as shown in FIGS. 3 to 6, the first blowing unit 51 is disposed above the discharge roller pair 25 in the vertical direction. Then, as shown in FIG. 4, the first blowing unit 51 blows air to one surface Pu of the paper sheet P2 to be discharged to the discharge tray 4 from upstream toward downstream in the discharge direction D in the air blowing direction F1.

Here, the first blowing unit 51 includes a fan 55 and an air blowing port 56. Specifically, as shown in FIGS. 3 to 5, the first blowing unit 51*a* includes a fan 55*a* and an air blowing port 56*a* and the first blowing unit 51*b* includes a fan 55*b* and an air blowing port 56*b*. It should be noted that louvers (not shown) are provided inside the air blowing port 56*a* and the air blowing port 56*b* and that the first blowing unit 51*a* can change the air blowing direction F1*a* and the first blowing unit 51*b* can change the air blowing direction F1*b*. Here, the louvers (not shown) can rotate 360° inside the air blowing port and can change the air blowing direction 360° in the up/down direction and right/left direction.

Also, as shown in FIGS. 3, the recording device 1 includes a fan 55*c* as the fan 55, a duct 57, and an airflow chamber 58, and an air blowing port 56*c*, an air blowing port 56*d*, and an air blowing port 56*e* as the air blowing port 56 formed in the airflow chamber 58 are provided. Specifically, the air blowing port 56*c*, the air blowing port 56*d*, and the air blowing port 56*e* are formed in the vicinity of a center portion of the discharge port 50 in the width direction W. With such a configuration, the air blowing port 56*c*, the air blowing port 56*d*, and the air blowing port 56*e* form the second blowing unit 52*a*, the second blowing unit 52*b*, and the second blowing unit 52*c* as the second blowing unit 52 respectively. It should be noted that louvers (not shown) are provided inside the air blowing port 56*c*, the air blowing port 56*d*, and the air blowing port 56*e* and that the second blowing unit 52*a* can change the air blowing direction F2*a*, the second blowing unit 52*b* can change the air blowing direction F2*b*, and the second blowing unit 52*c* can change the air blowing direction F2*c*. Here, the louvers (not shown) can rotate 360° inside the air blowing ports and can change the air blowing direction 360° in the up/down direction and in the right/left direction.

Here, as shown in FIG. 4, the second blowing unit 52 is disposed between the discharge roller pair 25 and the discharge tray 4 in the vertical direction and blows air, from upstream toward downstream in the discharge direction D, to the other surface P1 of the paper sheet P2 to be discharged to the discharge tray 4 in the air blowing direction F2. Specifically, as shown in FIG. 3, the second blowing unit 52*a*, the second blowing unit 52*b*, and the second blowing unit 52*c* blow air in the air blowing direction F2*a*, the air blowing direction F2*b*, and the air blowing direction F2*c* respectively.

That is, the recording device 1 of the present embodiment blows air, from upstream toward downstream in the discharge direction D, to one side Pu of the paper sheet P by the first blowing unit 51 from above in the vertical direction and blows air, from upstream toward downstream in the discharge direction D, to the other side P1 of the paper sheet P by the second blowing unit 52 from below in the vertical direction. That is, the paper sheet P to be discharged to the discharge tray 4 is guided downstream, pinched by the wind from above by the first blowing unit 51 and the wind from below by the second blowing unit 52. Therefore, the recording device 1 of the present embodiment suppresses the deformation in the discharge direction D of the paper sheet P to be discharged to the discharge tray 4 and improves the stackability of the paper sheet P.

Here, "suppressing deformation" does not mean preventing deformation completely only, but includes lessening of deformation by the air blowing as compared with the case where air blowing is absent.

In the recording device 1 of the present embodiment, driving control of the first blowing unit 51 and the second blowing unit 52 is performed by the control unit 9 shown in FIG. 2. Also, driving control of the third blowing unit 53 and the fourth blowing unit 54 to be described below in detail is also performed by the control unit 9.

Also, as shown in FIG. 3, the air blowing direction F1*a* by the first blowing unit 51*a*, on the direction W1 side in the width direction W, out of the first blowing unit 51 is inclined to the W1 side with respect to the discharge direction D and the air blowing direction F1*b* by the first blowing unit 51*b*, on the direction W2 side in the width direction W, out of the first blowing unit 51 is inclined to the W2 side with respect to the discharge direction D. Then, the air blowing direction F2*a* by the second blowing unit 52*a* out of the second blowing unit 52 on the direction W1 side is inclined to the W1 side with respect to the discharge direction D, and the air blowing direction F2*c* by the second blowing unit 52*c* out of the second blowing unit 52 on the direction W2 side is inclined to the W2 side with respect to the discharge direction D. In other words, the first blowing unit 51*a* and the second blowing unit 52*a* blow air toward the end portion Pfw1 downstream in the discharge direction D and on the W1 side in the width direction W shown in FIG. 7, and the first blowing unit 51*b* and the second blowing unit 52*c* blow air toward the end portion Pfw2 downstream in the discharge direction D and on the W2 side in the width direction W shown in FIG. 7. It should be noted that the second blowing unit 52*b* blows air straight toward the discharge direction D.

Here, "end portion" does not mean the front end only, but includes an area in the vicinity of the front end.

That is, in the recording device 1 of the present embodiment, the first blowing unit 51 and the second blowing unit 52 blows air to the paper sheet P to be discharged to the discharge tray 4, like the paper sheet P2 shown in FIG. 4 for example, so that an airflow is generated from upstream in the discharge direction D and the center side in the width direction W toward downstream in the discharge direction D and the end portions Pfw1 and Pfw2 sides in the width direction W. With such a configuration, the recording device 1 of the present embodiment discharges the paper sheet P to the discharge tray 4 in the direction from upstream toward downstream in the discharge direction D such that the paper sheet P is pressed and spread out in the width direction W by the airflow from the center side in the width direction W toward the end portion side. Then, with such a configuration, the recording device 1 of the present embodiment suppresses the deformation in the width direction W of the paper sheet to be discharged to the discharge tray 4.

Also, as described above, the recording device 1 of the present embodiment includes a sensor 60, shown in FIG. 2, that detects whether or not the stacking height of the paper sheet P stacked on the discharge tray 4 in the vertical direction has reached the upper limit, but the first blowing unit 51 and the second blowing unit 52 are disposed above the upper limit of the stacking height of the paper sheet P stacked on the discharge tray 4 in the vertical direction.

Therefore, the recording device 1 of the present embodiment is configured such that it is possible to suppress the deformation of the paper sheet P even if the stacking height of the paper sheet P reaches the upper limit.

Also, as described above, in the recording device 1 of the present embodiment, the first blowing unit 51 and the second blowing unit 52 can change the air blowing directions. Specifically, it is possible to change the air blowing directions in accordance with the length, in the discharge direction D, of the paper sheet P to be discharged to the discharge tray 4. Therefore, the recording device 1 of the present embodiment is configured to suitably suppress the deformation of the paper sheet P in accordance with the length, in the discharge direction D, of the paper sheet P to be used. Also, in accordance with the width of the paper sheet P to be used, the first blowing unit 51 and the second blowing unit 52 are configured to change air blowing directions. "Changing the air blowing directions in accordance with the length, in the discharge direction D, of the paper sheet P to be discharged to the discharge tray 4" means, for example, that the control unit 9 controls to change the air blowing direction based on the elapsed time after the passage of the paper sheet P is detected by the sensor that detects the passage of the paper sheet P and the size of the paper sheet P input by the user and to be used.

Further, in the recording device 1 of the present embodiment, the first blowing unit 51 and the second blowing unit 52 can change the air blowing directions following the position of the downstream end portion Pf of the paper sheet P to be discharged to the discharge tray 4 by the control of the control unit 9 shown in FIG. 2. Therefore, the recording device 1 of the present embodiment is configured to suppress the deformation of the end portion Pf downstream in the paper sheet P in particular. Specifically, for example, based on the elapsed time after the passage of the paper sheet P is detected by the sensor that detects the passage of the paper sheet P and the size of the paper sheet P input by the user and to be used, the control unit 9 grasps the position of the downstream end portion Pf and the control unit 9 controls the change of the air blowing direction following the position of the end portion Pf.

Also, as shown in FIGS. 3 to 6, the recording device 1 includes the third blowing unit 53. Specifically, an air blowing port **56*f* and an air blowing port 56*g* are provided as the air blowing port 56 formed in the airflow chamber 58. In detail, the air blowing port 56*f* and the air blowing port 56*g* are formed farther on the end portion sides in the width direction W of the discharge port 50 than the air blowing port 56*c*, the air blowing port 56*d*, and the air blowing port 56*e* as the second blowing unit 52. With such a configuration, the air blowing port 56*f* and the air blowing port 56*g* form the third blowing unit 53*a* and the third blowing unit 53*b* as the third blowing unit 53 respectively. It should be noted that louvers (not shown) are provided inside the air blowing port 56*f* and the air blowing port 56*g* and that the third blowing unit 53*a*** can change the air blowing direction F3*a* and the third blowing unit **53*b*** can change the air blowing direction F3*b*. Therefore, the third blowing unit **53*a* and the third blowing unit 53*b*** can change the air blowing directions in accordance with the paper sheet width of the paper sheet P to be used. Here, the louvers (not shown) can rotate 360° inside the air blowing ports and can change the air blowing direction 360° in the up/down direction and the right/left direction.

Also, as shown in FIGS. 3 to 6, the third blowing unit 53 is disposed between the discharge roller pair 25 and the discharge tray 4 in the vertical direction. Then, as shown in FIGS. 4 to 6, the third blowing unit 53 blows air to the paper sheet P in the state of being discharged to the discharge tray 4 toward the upstream end portion Pb in the discharge direction D in the air blowing direction F3.

In this way, the recording device 1 of the present embodiment includes the third blowing unit 53 that blows air to the paper sheet P in the state of being discharged to the discharge tray 4 toward the upstream end portion Pb in the discharge direction D, and it is possible to suppress the deformation, the curving of the upstream end portion Pb of the paper sheet P in particular, of the paper sheet P after being discharged to the discharge tray 4.

Also, as shown in FIGS. 3 to 5, the air blowing direction F3*a* by the third blowing unit **53*a*, on the direction W1 side in the width direction W, out of the third blowing unit 53 is inclined to the W1** side with respect to the discharge direction D, and the air blowing direction F3*b* by the third blowing unit **53*b*, on the direction W2 side in the width direction W, out of the third blowing unit 53 is inclined to the W2 side with respect to the discharge direction D. In other words, the third blowing unit 53*a* blows air toward the W1 side end portion Pbw1 upstream in the discharge direction D and in the width direction W shown in FIG. 7, and the third blowing unit 53*b* blows air toward the W2 side end portion Pbw2 upstream in the discharge direction D and in the width direction W shown in FIG. 7**.

That is, in the recording device 1 of the present embodiment, the third blowing unit 53 is configured to blow air toward the end portion of the paper sheet P in the width direction W, and it is possible to suppress the curving of the end portions Pbw1 and Pbw2, upstream and in the width direction W, of the paper sheet P after being discharged to the discharge tray 4.

Also, as shown in FIGS. 5 and 6, the recording device 1 includes the fourth blowing unit 54. As shown in FIG. 5, in the fourth blowing unit 54, the two of a fourth blowing unit **54*a* and a fourth blowing unit 54*b* are formed farther on the end portion sides in the width direction W than the first blowing unit 51. Also, as shown in FIGS. 5 and 6, the fourth blowing unit 54 is disposed above the discharge roller pair 25 in the vertical direction. Then, as shown in FIG. 6, the fourth blowing unit 54 blows air to the paper sheet P in the state of being discharged to the discharge tray 4 toward the upstream end portion Pb of the paper sheet P in the air blowing direction F4. With such a configuration, in the recording device 1 of the present embodiment, it is possible to suppress the deformation, the curving of the upstream end portion Pb of the paper sheet P in particular, of the paper sheet P after being discharged to the discharge tray 4. It should be noted that the simultaneous air blowing from the third blowing unit 53 and the fourth blowing unit 54** particularly enhances the deformation suppression effect of the paper sheet P.

Here, the fourth blowing unit 54 includes the fan 55 and the air blowing port 56. Specifically, as shown in FIG. 5, the fourth blowing unit **54*a* includes a fan 55*d* and an air blowing port 56*h*, and the fourth blowing unit 54*b* includes a fan 55*e* and an air blowing port 56*i*. It should be noted that louvers (not shown) are provided inside the air blowing port 56*h* and the air blowing port 56*i* and that the fourth blowing unit 54*a*** can change the air blowing direction F4*a* and the fourth blowing unit **54*b*** can change the air blowing direction F4*b*. Here, the louvers (not shown) can rotate 360° inside the air blowing port and can change the air blowing directions 360° in the up/down direction and the right/left direction.

However, both the fourth blowing unit **54*a* and the fourth blowing unit 54*b* blow air toward the end portions of the paper sheet P in the width direction W. This is to suppress the curving of the end portions Pbw1 and Pbw2, upstream and in the width direction W, of the paper sheet P after being discharged to the discharge tray 4. As the louvers are provided inside the air blowing port 56***h* and the air blowing port 56*i*, the fourth blowing unit 54*a* can change the air blowing direction F4*a* in accordance with the paper sheet width of the paper sheet P to be used, and the fourth blowing unit 54*b* can change the air blowing direction F4*b*.

In the state after the paper sheet P2 is discharged to the discharge tray 4, the air blowing direction F1*a* by the first blowing unit 51*a*, on the direction W1 side in the width direction W, out of the first blowing unit 51 is toward the end portion Pfw1 on the direction W1 side downstream and in the width direction W of the paper sheet P, and the air blowing direction F1*b* by the first blowing unit 51*b*, on the direction W2 side in the width direction W, out of the first blowing unit 51 is toward the end portion Pfw2 on the direction W2 side downstream and in the width direction W of the paper sheet P.

As described above, the first blowing unit 51 can change the air blowing direction F1 and the fourth blowing unit 54 can change the air blowing direction F4. In the recording device 1 of the present embodiment, by the control of the control unit 9 shown in FIG. 2, the first blowing unit 51 and the fourth blowing unit 54 can change the air blowing directions in accordance with the positions, in the width direction W, of the end portions of the paper sheet P in the state of being discharged to the discharge tray 4. Therefore, the recording device 1 of the present embodiment can suppress the deformation of the end portions Pfw1 and Pfw2, downstream and in the width direction W, of the paper sheet P by the first blowing unit 51 and can suppress the deformation of the end portions Pbw1 and Pbw2, upstream and in the width direction W, of the paper sheet P by the fourth blowing unit 54. A sensor may be used to detect the position, in the width direction W, of the end portion of the paper sheet P in the state of being discharged to the discharge tray 4, but the control unit 9 determines based on the input by the user of the size of the paper sheet P to be used in the present embodiment.

Next, the flow of the discharging operation of the recording medium performed by the recording device 1 of the present embodiment, in other words, the stacking flow of the paper sheet P onto the discharge tray 4, will be described with reference to FIGS. 8 to 10. The air blowing timing in FIG. 9 represents the air blowing timing performed following the air blowing timing in FIG. 8. Here, specifically, the first blowing unit 51 in FIGS. 8 and 9 represents the first blowing unit 51*a* and the first blowing unit 51*b*.

Figure 8:
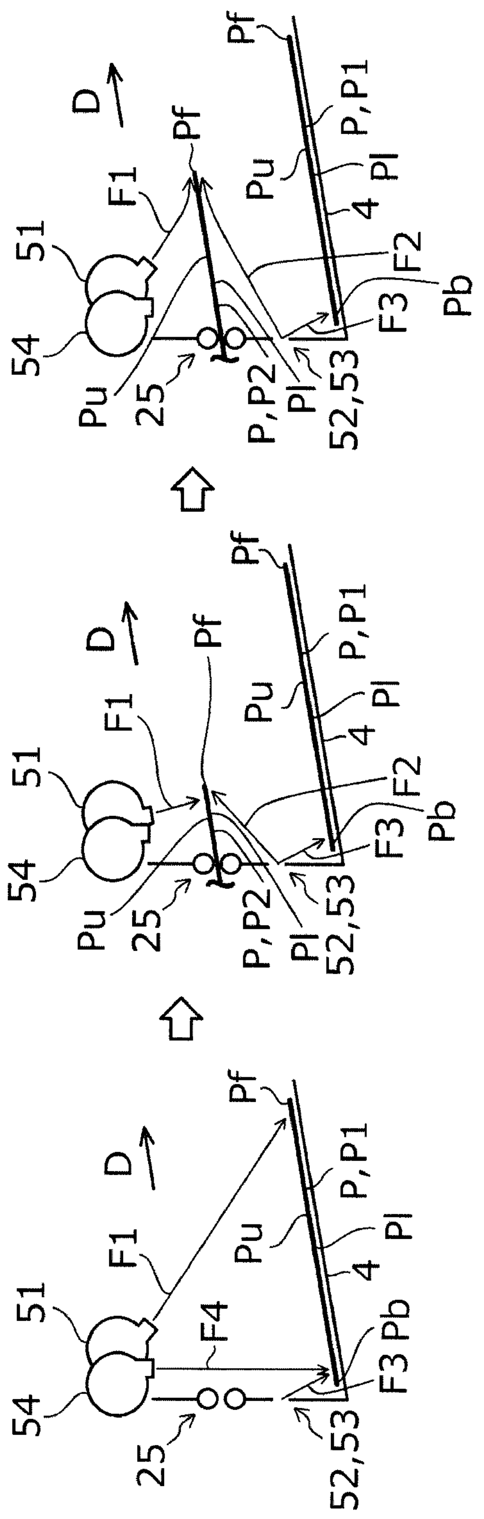
FIG. 8 is a schematic view showing blowing timing in the recording device according to Embodiment 1 of the disclosure.
Figure 9:
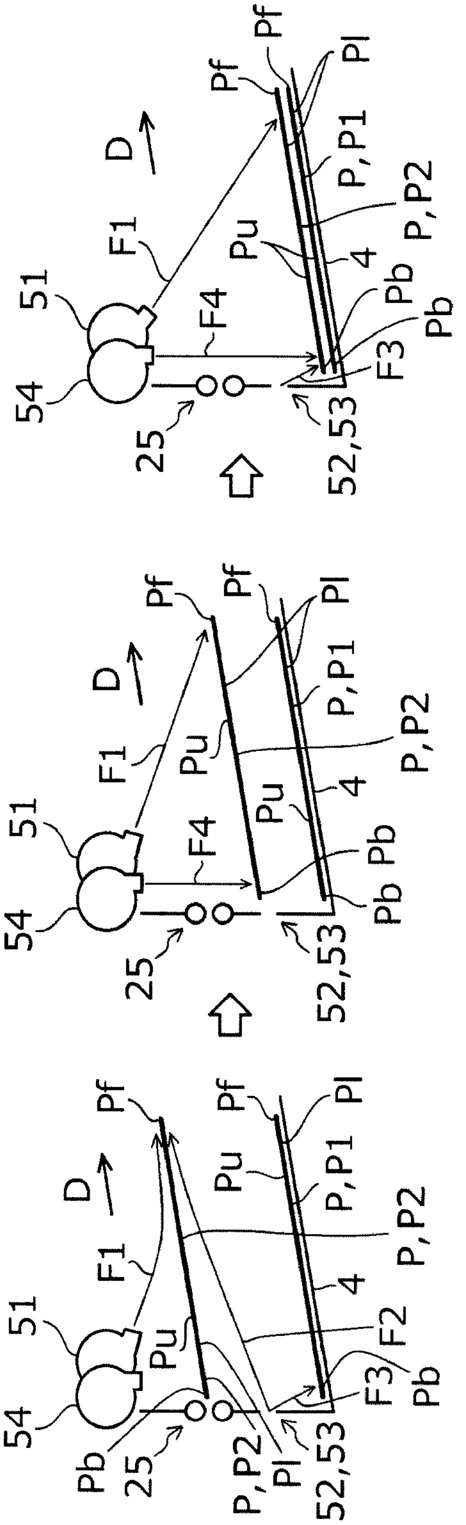
FIG. 9 is a schematic view showing the blowing timing in the recording device according to Embodiment 1 of the disclosure.

As shown in the left drawing of FIG. 8, before the start of the discharging operation flow of the recording medium of the present example, when the paper sheet P is discharged and stacked on the discharge tray 4, air is blown from the first blowing unit 51 toward the downstream end portion Pf of the stacked paper sheet P1 in the air blowing direction F1, air is blown from the third blowing unit 53 toward the upstream end portion Pb of the paper sheet P1 in the air blowing direction F3, and air is blown from the fourth blowing unit 54 toward the upstream end portion Pb of the paper sheet P1 in the air blowing direction F4. As the first blowing unit 51, the third blowing unit 53, and the fourth blowing unit 54 blow air in this manner, it is possible to suppress the deformation of the paper sheet P1 stacked on the discharge tray 4. It should be noted that the air blowing of the first blowing unit 51, the third blowing unit 53, and the fourth blowing unit 54 may be stopped when the paper sheet P is not stacked on the discharge tray 4.

Figure 10:
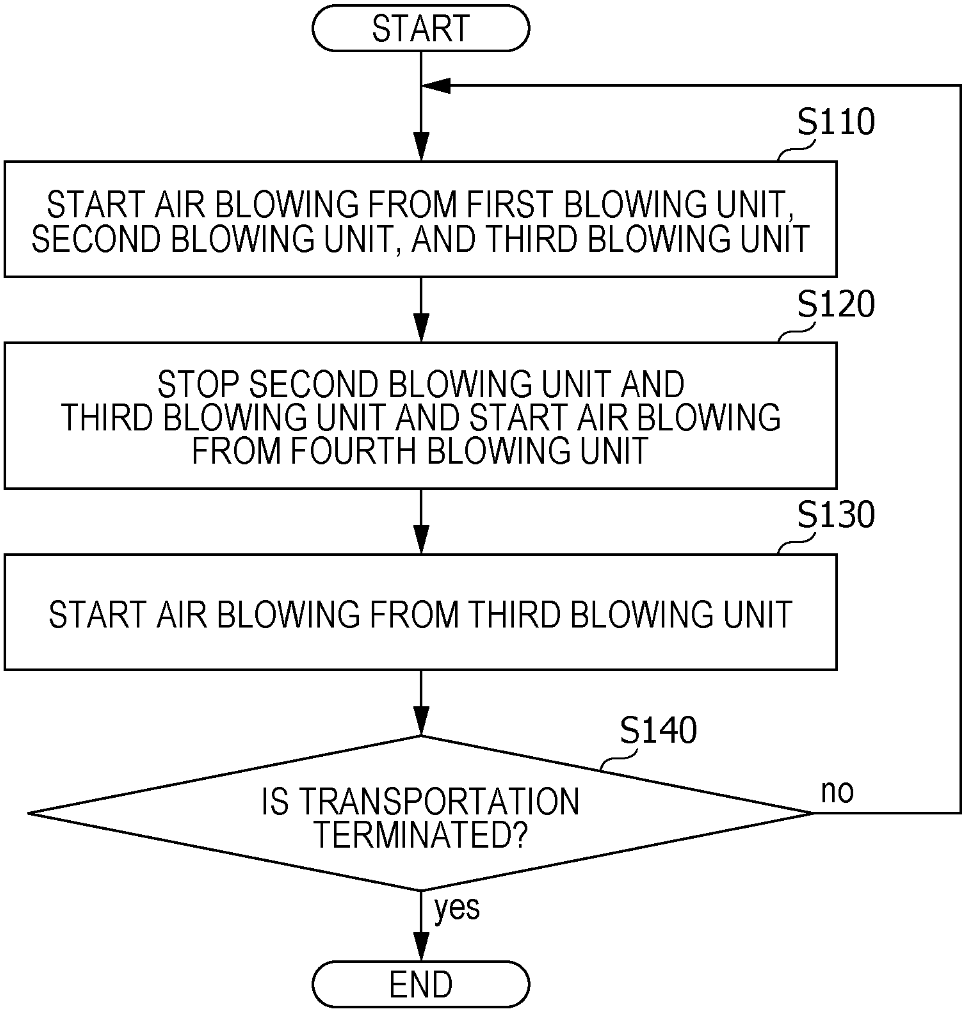
FIG. 10 is a flowchart showing an example of a discharging operation flow of the recording medium by using a recording device according to Embodiment 1 of the disclosure.

Then, when the discharging operation flow of the recording medium of the present example is started, first, in step S110 in FIG. 10, air blowing gets started from the first blowing unit 51 to one surface Pu of the paper sheet P2 to be discharged to the discharge tray 4 from upstream toward downstream in the discharge direction D, and air blowing gets started from the second blowing unit 52 to the other surface P1 of the paper sheet P2 to be discharged to the discharge tray 4 from upstream toward downstream in the discharge direction D. The state in step S110 is shown by the middle drawing in FIG. 8. Specifically, from the state shown by the left drawing in FIG. 8, the air blowing direction F1 from the first blowing unit 51 is changed, air blowing from the second blowing unit 52 is started, and air blowing from the fourth blowing unit 54 is stopped. It should be noted that when the paper sheet P is not stacked on the discharge tray 4, the air blowing of the third blowing unit 53 may be stopped. It should be noted that the state shown by the middle drawing in FIG. 8 corresponds to the state shown in FIGS. 3 and 4.

As the state in step S110 continues, as shown in the right drawing in FIG. 8 and, furthermore, the left drawing in FIG. 9, the discharge state of the paper sheet P2 changes. Then, as described above, along with the change of the discharge state of the paper sheet P2, the first blowing unit 51 and the second blowing unit 52 blow air to the paper sheet P2 to be discharged from the discharge roller pair 25, that is, to the paper sheet P2 to be discharged to the discharge tray 4, by changing the air blowing direction F1 and the air blowing direction F2 so that an airflow is generated from upstream in the discharge direction D and the center side in the width direction W toward downstream in the discharge direction D and the end portions Pfw1 and Pfw2 sides in the width direction W.

As shown in the middle drawing in FIG. 9, when the entire paper sheet P2 is discharged from the discharge roller pair 25, the air blowing from the second blowing unit 52 and the third blowing unit 53 is stopped and the air blowing from the fourth blowing unit 54 gets started in step S120 in FIG. 10. Thus, stacking on the discharge tray 4 of the paper sheet P2, the whole of which is discharged from the discharge roller pair 25, is facilitated. The elapsed time after the passage of the paper sheet P is detected by the sensor that detects the passage of the paper sheet P or the detection result of the paper sheet P2 by the sensor 60 may be used to determine that the entire paper sheet P2 is discharged from the discharge roller pair 25, but another method may be performed.

As shown in the right drawing in FIG. 9, when the paper sheet P2 is stacked on the discharge tray 4, the air blowing from the third blowing unit 53 gets started in step S130 in FIG. 10. The elapsed time after the sensor 60 detects the paper sheet P2 may be used to determine that the paper sheet P2 is stacked on the discharge tray 4, but another method may be performed. It should be noted that the state shown in the right drawing in FIG. 9 corresponds to the state shown in FIGS. 5 and 6.

In step S140, in determining whether or not a new paper sheet P is to be further transported, that is, to be discharged to the discharge tray 4, when it is determined that a new paper sheet P is to be transported, the operation process returns to step S110, and when it is determined that the transport of the paper sheet P is terminated, the discharging operation flow of the recording medium of the present example is terminated. That is, when one paper sheet P is discharged, steps S110 to S140 are performed once, and when a plurality of paper sheets P are discharged, steps S110 to S140 are as many times as the number of the plurality of paper sheets.

As shown in the middle drawing in FIG. 8, the right drawing in FIG. 8, and the left drawing in FIG. 9, in step S110, the first blowing unit 51 and the third blowing unit 53 continue to blow air continuously during the period when the paper sheet P is discharged from the discharge roller pair 25. That is, when a plurality of paper sheets P are discharged from the discharge roller pair 25, the third blowing unit 53 continues to blow air continuously to the upstream end portion Pb of the paper sheet P in the state of being discharged to the discharge tray 4, the first blowing unit 51 continues to blow air continuously to the downstream end portion Pf of the paper sheet P in the state of being discharged to the discharge tray 4. This is because a part of the air blowing from the first blowing unit 51 flowing through the paper sheet P reaches the downstream end portion Pf of the paper sheet P in the state of being discharged to the discharge tray 4 even while a paper sheet P is being discharged from the discharge roller pair 25. Therefore, for example, when a plurality of the paper sheets P are discharged from the discharge roller pair 25, the recording device 1 of the present embodiment can enhance the suppression effect of the deformation of the paper sheet P in the state of being discharged to the discharge tray 4.

Also, after step S140, based on the removal of the paper sheet P from the discharge tray 4 or the lapse of the predetermined time after the paper sheet P is last discharged from the discharge roller pair 25 when the paper sheet P continues to be discharged from the discharge roller pair 25, the recording device 1 of the present embodiment can execute the step of stopping the air blowing from the first blowing unit 51 and the third blowing unit 53. As the step is executed, it is possible to suppress unnecessary air blowing after the paper sheet P is removed from the discharge tray 4 or when the deformation of the paper sheet P hardly occurs after a predetermined time has elapsed after the paper sheet P is last discharged from the discharge roller pair 25. A detection sensor (not shown) of the paper sheet P may be used to determine that the paper sheet P is removed from the discharge tray 4, but another method may be performed.

Also, after step S140, based on the removal of the paper sheet P from the discharge tray 4 or the lapse of the predetermined time after the paper sheet P is last discharged from the discharge roller pair 25 when the paper sheet P continues to be discharged from the discharge roller pair 25, the recording device 1 of the present embodiment can execute the step of stopping the air blowing from the fourth blowing unit 54. As the step is executed, it is possible to suppress unnecessary air blowing after the paper sheet P is removed from the discharge tray 4 or when the deformation of the paper sheet P hardly occurs after a predetermined time has elapsed after the paper sheet P is last discharged from the discharge roller pair 25.

As shown in the middle drawing in FIG. 9, in step S120, the fourth blowing unit 54 starts to blow air as the upstream end portion Pb of the paper sheet P is discharged from the discharge roller pair 25. Therefore, by blowing air to the upstream end portion Pb as soon as the upstream end portion Pb is discharged from the discharge roller pair 25, the recording device 1 of the present embodiment can enhance the suppression effect of the deformation of the paper sheet P is in the middle of being discharged from the discharge roller pair 25. Also, it is possible to facilitate the stacking of the paper sheet P discharged from the discharge roller pair 25 on the discharge tray 4. The elapsed time after the passage of the paper sheet P is detected by the sensor that detects the passage of the paper sheet P may be used to determine that the upstream end portion Pb of the paper sheet P is discharged from the discharge roller pair 25, but another method may be performed.

Also, when the paper sheet P is continuously discharged from the discharge roller pair 25, the recording device 1 of the present embodiment stops blowing air from the fourth blowing unit 54 after the paper sheet P1 which is a preceding recording medium as shown in the left drawing in FIG. 8 is discharged from the discharge roller pair 25 until the downstream end portion Pf of the paper sheet P2 that is the succeeding recording medium to be discharged from the discharge roller pair 25 following the paper sheet P1 as shown in the middle drawing in FIG. 8 starts to be discharged from the discharge roller pair 25.

When the fourth blowing unit 54 continues to blow air even after the downstream end portion Pf of the paper sheet P2 starts to be discharged from the discharge roller pair 25 after the paper sheet P1 is discharged from the discharge roller pair 25, there is a concern that the downstream end portion Pf of the paper sheet P2 is deformed by the fourth blowing unit 54. However, by stopping the air blowing from the fourth blowing unit 54 after the paper sheet P1 is discharged from the discharge roller pair 25 until the downstream end portion Pf of the paper sheet P2 starts to be discharged from the discharge roller pair 25, it is possible to suppress the deformation of the downstream end portion Pf of the paper sheet P2.

Here, as shown in the middle drawing in FIG. 8, the right drawing in FIG. 8, and the left drawing in FIG. 9, in step S110, the second blowing unit 52 blows air after the downstream end portion Pf of the paper sheet P2 starts to be discharged from the discharge roller pair 25 until the upstream end portion Pb of the paper sheet P2 is discharged from the discharge roller pair 25. Therefore, the recording device 1 of the embodiment can enhance the suppression effect of the deformation of the paper sheet P in the middle of being discharged from the discharge roller pair 25.

Then, as shown in the middle drawing in FIG. 9, in step S120, the second blowing unit 52 stops blowing air as the upstream end portion Pb of the paper sheet P2 is discharged from the discharge roller pair 25. Therefore, the recording device 1 of the present embodiment can suppress unnecessary air blowing that hinders the paper sheet P from being stacked on the discharge tray 4.

Figure 11:
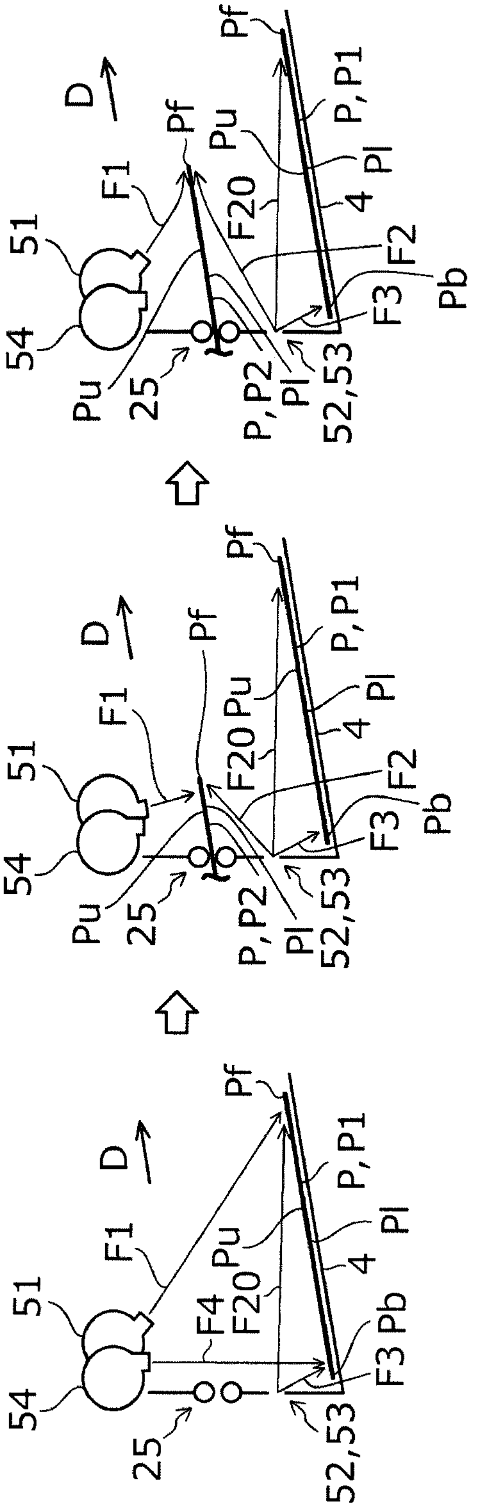
FIG. 11 is a schematic view showing the blowing timing in the recording device according to Embodiment 2 of the disclosure.
Figure 12:
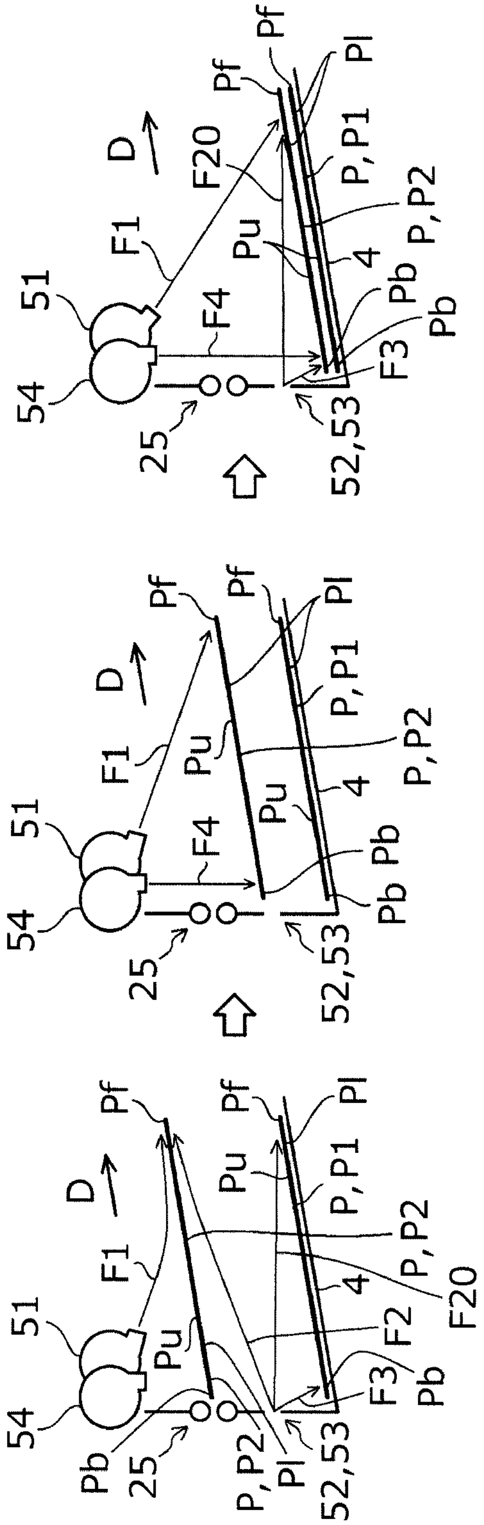
FIG. 12 is a schematic view showing the blowing timing in the recording device according to Embodiment 2 of the disclosure.

Embodiment 2 (FIGS. 11 and 12)

Next, the recording device 1 of Embodiment 2 will be described.

FIG. 11 is a schematic view of the recording device 1 of the present embodiment corresponding to FIG. 8 that describes the recording device 1 of Embodiment 1. Also, FIG. 12 is a schematic view of the recording device 1 of the present embodiment corresponding to FIG. 9 that describes the recording device of Embodiment 1. Here, specifically, the first blowing unit 51 in FIGS. 11 and 12 represents the first blowing unit 51 that corresponds to the first blowing unit 51*a* and the first blowing unit 51*b*. It should be noted that constituent member common to Embodiment 1 and the present embodiment is denoted by the same reference numeral and a detailed description thereof will not be repeated.

It should be noted that the recording device 1 of the present embodiment has the same configuration as the recording device 1 of Embodiment 1 except the second blowing unit 52 can blow air to the paper sheet P in the state of being discharged to the discharge tray 4.

As shown in the left drawing, middle drawing, and the right drawing in FIG. 11 and the left drawing and the right drawing in FIG. 12, the second blowing unit 52 in the recording device 1 of the present embodiment is configured to blow air toward the paper sheet P in a state of being discharged to the discharge tray 4 in an air blowing direction F20 in addition to the air blowing direction F2. Specifically, the second blowing unit 52 is configured to blow air toward the end portions Pfw1 and Pfw2, downstream in the discharge direction D and in width direction W, of the paper sheet P shown in FIG. 7.

Also, as shown in the left drawing in FIG. 11 and the right drawing in FIG. 12, the first blowing unit 51 can blow air to the downstream end portion Pf of the paper sheet P1 in the state of being discharged from the discharge tray 4. Precisely, it is possible to blow air toward the end portions Pfw1 and Pfw2, downstream and in the width direction W, of the paper sheet P1.

That is, in the recording device 1 of the present embodiment, the first blowing unit 51 and the second blowing unit 52 blow air to the paper sheet P1 in the state of being discharged on the discharge tray 4 toward the end portions Pfw1 and Pfw2 downstream in the discharge direction D and in the width direction W. Therefore, it is possible to suppress the deformation, the curving of the downstream end portions Pfw1 and Pfw2 downstream and in the width direction W of the paper sheet P in particular, of the paper sheet P after being discharged to the discharge tray 4.

The recording device 1 of the present embodiment includes the second blowing unit 52*a*, the second blowing unit 52*b*, and the second blowing unit 52*c* as the second blowing unit 52, similarly to the recording device 1 of Embodiment 1. Each of the second blowing unit 52 is configured to be able to divide the airflow in the up/down direction. However, the present embodiment is not limited to such a configuration. The second blowing unit 52 that blows air, from upstream toward downstream in the discharge direction D, to the other surface P1 of the paper sheet P2 to be discharged to the discharge tray 4 and the second blowing unit 52 that can blow air to the paper sheet P1 in the state of being discharged to the discharge tray 4 may be provided separately.

As seen from the comparison of FIG. 8 with FIG. 11 and FIG. 9 with FIG. 12, the difference in the discharging operation flow of the recording medium between the recording device 1 of the present embodiment and the recording device 1 of Embodiment 1 is that, in the recording device 1 of the present embodiment, in the states shown in the left drawing, the middle drawing, and the right drawing in FIG. 11 and the left drawing and the right drawing in FIG. 12, the second blowing unit 52 blows air to the paper sheet P1 in the state of being discharged to the discharge tray 4 toward the end portions Pfw1 and Pfw2 downstream in the discharge direction D and in the width direction W.

Figure 13:
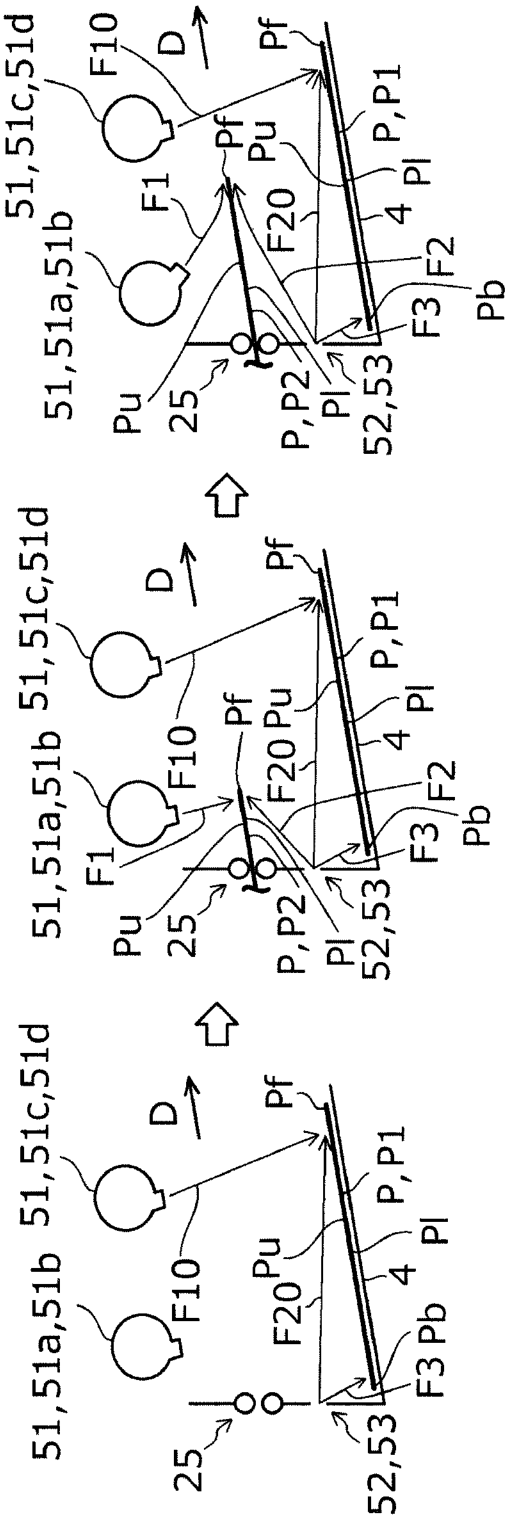
FIG. 13 is a schematic view showing the blowing timing in the recording device according to Embodiment 3 of the disclosure.
Figure 14:
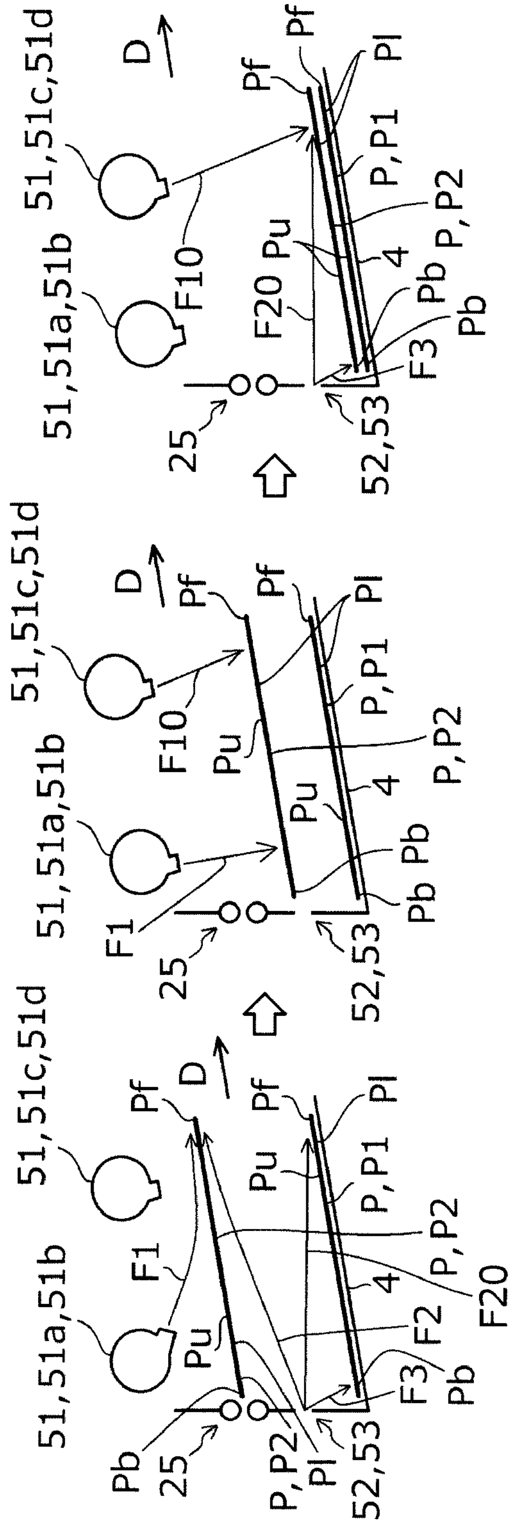
FIG. 14 is a schematic view showing the blowing timing in the recording device according to Embodiment 3 of the disclosure.

Embodiment 3 (FIGS. 13 and 14)

Next, a recording device 1 of Embodiment 3 will be described.

FIG. 13 is a schematic view of the recording device 1 of the present embodiment corresponding to FIG. 8 that describes the recording device 1 of Embodiment 1. Also, FIG. 14 is a schematic view of the recording device 1 of the present embodiment corresponding to FIG. 9 that describes the recording device 1 of Embodiment 1. It should be noted that the constituent member common to the above Embodiment 1, Embodiment 2, and the present embodiment is denoted by the same reference numeral and a detailed description thereof will not be repeated.

The recording device 1 of the present embodiment does not include the fourth blowing unit 54 but has the same configuration as the recording device 1 of Embodiment 2 except that the first blowing unit 51*c* and the first blowing unit 51*d* blow air in the air blowing direction F10.

In the recording device 1 of the present embodiment, as shown in the left drawing in FIG. 13, when the paper sheet P is discharged and is stacked on the discharge tray 4 before the discharging operation flow of the recording medium starts, air is blown from the first blowing units 51*c* and 51*d* downstream in the discharge direction D toward the downstream end portion Pf of the stacked paper sheet P1 in the air blowing direction F10, air is blown from the second blowing unit 52 toward the downstream end portion Pf of the stacked paper sheet P1 in the air blowing direction F20, and air is blown from the third blowing unit 53 toward the upstream end portion Pb of the stacked paper sheet P1 in the air blowing direction F3. As the first blowing unit 51, the second blowing unit 52, and the third blowing unit 53 downstream in the discharge direction D blow air in this manner, the deformation of the paper sheet P1 stacked on the discharge tray 4 is suppressed.

Then, as shown in the middle drawing in FIG. 13, when the discharging operation flow of the recording medium gets started, air blowing gets started from the first blowing unit 51 upstream in the discharge direction D to one surface Pu of the paper sheet P2 stacked on the discharge tray 4 from upstream toward downstream in the discharge direction D, and air blowing gets started from the second blowing unit 52 to the other surface P1 of the paper sheet P2 to be discharged to the discharge tray 4 from upstream toward downstream in the discharge direction D.

Thereafter, as shown in the right drawing in FIG. 13 and, furthermore, in the left drawing in FIG. 14, by changing the air blowing direction F1 and the air blowing direction F2 along with the change of the discharge state of the paper sheet P2, the first blowing units 51*a* and 51*b* upstream in the discharge direction D and the second blowing unit 52 blow air to the paper sheet P2 to be discharged to the discharge tray 4 so that an airflow is generated from upstream in the discharge direction D and the center side in the width direction W toward downstream in the discharge direction D and the end portions Pfw1 and Pfw2 sides in the width direction W. It should be noted that, as shown in the left drawing in FIG. 14, when the downstream end portion Pf of the paper sheet P1 reaches the position where the downstream end portion Pf meets the air blowing direction F10 of the first blowing unit 51*c* and the first blowing unit 51*d* downstream in the discharge direction D, the first blowing unit 51 downstream in the discharge direction D stops blowing air.

Then, as shown in the middle drawing in FIG. 14, when the entire paper sheet P2 is discharged from the discharge roller pair 25, the air blowing from the second blowing unit 52 and the third blowing unit 53 is stopped, the air blowing direction F1 of the first blowing units 51*a* and 51*b* upstream in the discharge direction D is turned toward the upstream end portion Pb of the paper sheet P2, and the air blowing from the first blowing units 51*c* and 51*d* downstream in the discharge direction D gets started.

Then, as shown in the right drawing in FIG. 14, when the paper sheet P2 is stacked on the discharge tray 4, the air blowing from the second blowing unit 52 and the third blowing unit 53 gets started, and the air blowing of the first blowing units 51*a* and 51*b* upstream in the discharge direction D is stopped.

The recording device 1 of the present embodiment is configured to be particularly effective when a paper sheet P long in the discharge direction D is discharged.

It should be noted that the present disclosure is not limited to the above embodiments, and various modifications are possible within the scope of the disclosure described in the claims, and it goes without saying that the modifications are also included within the scope of the present disclosure.

For example, when it is possible to blow air from two or more blowing units at the same position to the paper sheet P in the state of being discharged from the discharge tray 4, the air blowing may be from the entire blowing units, or the air blowing from any of the blowing units may be stopped.

What is claimed is:

1. A recording device comprising:

a recording head that records by ejecting a liquid onto a recording medium;

a discharge unit that discharges the recording medium recorded by the recording head;

a discharge tray that receives, from a lower side in a vertical direction, the recording medium discharged from the discharge unit in a discharge direction;

a first blowing unit that is disposed above the discharge unit in the vertical direction and blows air, from upstream toward downstream in the discharge direction, toward one surface of the recording medium to be discharged to the discharge tray;

a second blowing unit that is disposed between the discharge unit and the discharge tray in the vertical direction and blows air, from upstream toward downstream in the discharge direction, toward the other surface of the recording medium to be discharged to the discharge tray; and a control unit that controls the first blowing unit and the second blowing unit, wherein deformation of the recording medium to be discharged is suppressed by wind of the first blowing unit and the second blowing unit and the recording medium is discharged, and wherein a first blowing direction from the first blowing unit and a second blowing direction from the second blowing unit intersect.

2. A recording device comprising:

a recording head that records by ejecting a liquid onto a recording medium;

a discharge unit that discharges the recording medium recorded by the recording head;

a discharge tray that receives, from a lower side in a vertical direction, the recording medium discharged from the discharge unit in a discharge direction;

a first blowing unit that is disposed above the discharge unit in the vertical direction and blows air, from upstream toward downstream in the discharge direction, toward one surface of the recording medium to be discharged to the discharge tray;

a second blowing unit that is disposed between the discharge unit and the discharge tray in the vertical direction and blows air, from upstream toward downstream in the discharge direction, toward the other surface of the recording medium to be discharged to the discharge tray; and a control unit that controls the first blowing unit and the second blowing unit, wherein deformation of the recording medium to be discharged is suppressed by wind of the first blowing unit and the second blowing unit and the recording medium is discharged, wherein the second blowing unit has a discharge unit side that is a side closest to the discharge unit and a discharge tray side that is a side closest to the discharge tray, the discharge unit side being on an opposite side of the second blowing unit from the discharge tray side, and the second blowing unit blows air toward the discharge unit side in an upward direction.

3. The recording device according to claim 1, further comprising:

a third blowing unit that is disposed between the discharge unit and the discharge tray in the vertical direction and blows air to the recording medium in a state of being discharged to the discharge tray, toward an upstream end portion.

4. The recording device according to claim 3, wherein the control unit causes the third blowing unit to blow air toward the side end portion in the width direction that intersects with the discharge direction in the recording medium.

5. The recording device according to claim 3, wherein the control unit causes the first blowing unit and the third blowing unit to continue to blow air continuously during a period when the recording medium is discharged from the discharge unit.

6. The recording device according to claim 5, wherein the control unit causes the first blowing unit and the third blowing unit to stop blowing air based on removal of the recording medium from the discharge tray or a lapse of predetermined time after the recording medium is last discharged from the discharge unit when the recording medium is continuously discharged from the discharge unit.

7. The recording device according to claim 1, further comprising:

a fourth blowing unit that is disposed above the discharge unit in the vertical direction and blows air to the recording medium in a state of being discharged to the discharge tray, toward an upstream end portion.

8. The recording device according to claim 7, wherein the fourth blowing unit is disposed outside the first blowing unit in the width direction that intersects with the discharge direction, and the control unit causes the fourth blowing unit to blow air toward the side end portion in the width direction in the recording medium.

9. The recording device according to claim 7, wherein the control unit causes the fourth blowing unit to start to blow air as the upstream end portion in the recording medium is discharged from the discharge unit.

10. The recording device according to claim 9, wherein when the recording medium is continuously discharged from the discharge unit, the control unit causes the fourth blowing unit to stop blowing air after a preceding recording medium is discharged from the discharge unit until the downstream end portion of a succeeding recording medium to be discharged from the discharge unit succeeding the preceding recording medium starts to be discharged from the discharge unit.

11. The recording device according to claim 9, wherein the control unit causes the fourth blowing unit to stop blowing air based on removal of the recording medium from the discharge tray or lapse of predetermined time after the recording medium is last discharged from the discharge unit when the recording medium is continuously discharged from the discharge unit.

12. The recording device according to claim 7, wherein the control unit causes the first blowing unit and the fourth blowing unit to change air blowing directions in accordance with a position of the side end portion in the width direction that intersects with the discharge direction in the recording medium in the state of being discharged from the discharge tray.

13. The recording device according to claim 1, wherein the control unit causes the second blowing unit to blow air after the downstream end portion in the recording medium starts to be discharged from the discharge unit until an upstream end portion in the recording medium is discharged from the discharge unit and causes the second blowing unit to stop blowing air as the upstream end portion in the recording medium is discharged from the discharge unit.

14. The recording device according to claim 1, wherein the first blowing unit and the second blowing unit are disposed above an upper limit of stacking height of the recording medium to be stacked on the discharge tray in the vertical direction.

15. The recording device according to claim 1, wherein the control unit causes the first blowing unit and the second blowing unit to change air blowing directions in accordance with a length, in the discharge direction, of the recording medium to be discharged from the discharge tray.

16. The recording device according to claim 15, wherein the control unit causes the first blowing unit and the second blowing unit to change air blowing directions following a position of the downstream end portion in the recording medium to be discharged from the discharge tray.

17. A recording device comprising:

a recording head that records by ejecting a liquid onto a recording medium;

a discharge unit that discharges the recording medium recorded by the recording head;

a discharge tray that receives, from a lower side in a vertical direction, the recording medium discharged from the discharge unit in a discharge direction;

a first blowing unit that is disposed above the discharge unit in the vertical direction and blows air, from upstream toward downstream in the discharge direction, toward one surface of the recording medium to be discharged to the discharge tray;

a second blowing unit that is disposed between the discharge unit and the discharge tray in the vertical direction and blows air, from upstream toward downstream in the discharge direction, toward the other surface of the recording medium to be discharged to the discharge tray; and a control unit that controls the first blowing unit and the second blowing unit, wherein deformation of the recording medium to be discharged is suppressed by wind of the first blowing unit and the second blowing unit and the recording medium is discharged, and wherein air blowing directions of the first blowing unit and the second blowing unit are changeable, and the control unit changes air blowing directions of the first blowing unit and the second blowing unit.

18. The recording device according to claim 17, wherein the control unit causes the first blowing unit and the second blowing unit to blow air to the recording medium to be discharged to the discharge tray so that an airflow is generated from an upstream side in the discharge direction and center side in a width direction that intersects with the discharge direction toward a downstream end portion in the discharge direction and side end portion in the width direction.

19. The recording device according to claim 17, wherein the control unit causes the first blowing unit and the second blowing unit to blow air to the recording medium in a state of being discharged to the discharge tray, toward a downstream end portion in the discharge direction and side end portion in the width direction that intersects with the discharge direction.

* * * * *